United States Patent
Yanagida

(10) Patent No.: US 7,949,917 B2
(45) Date of Patent: May 24, 2011

(54) MAINTAINING DATA COHERENCY IN MULTI-CLOCK SYSTEMS

(75) Inventor: Seiji Yanagida, Ibaragi-Prefecture (JP)

(73) Assignee: Texas Instruments Incorporated, Dallas, TX (US)

( * ) Notice: Subject to any disclaimer, the term of this patent is extended or adjusted under 35 U.S.C. 154(b) by 616 days.

(21) Appl. No.: 11/956,103

(22) Filed: Dec. 13, 2007

(65) Prior Publication Data

US 2009/0157761 A1 Jun. 18, 2009

(51) Int. Cl.
*G01R 31/28* (2006.01)
*G06F 11/00* (2006.01)

(52) U.S. Cl. ........................................ 714/727; 714/744
(58) Field of Classification Search .................. None
See application file for complete search history.

(56) References Cited

U.S. PATENT DOCUMENTS

| | | | |
|---|---|---|---|
| 5,434,804 A * | 7/1995 | Bock et al. | 702/117 |
| 6,658,578 B1 * | 12/2003 | Laurenti et al. | 713/324 |
| 7,149,927 B2 * | 12/2006 | Stancil | 714/31 |
| 7,489,724 B2 * | 2/2009 | Warren | 375/221 |
| 7,506,228 B2 * | 3/2009 | Pedersen | 714/724 |
| 2003/0094934 A1 * | 5/2003 | Date et al. | 324/73.1 |
| 2003/0198185 A1 * | 10/2003 | Stancil | 370/241 |
| 2008/0028269 A1 * | 1/2008 | Imming et al. | 714/738 |
| 2008/0147901 A1 * | 6/2008 | Gloekler et al. | 710/11 |
| 2008/0307282 A1 * | 12/2008 | Dono et al. | 714/736 |

OTHER PUBLICATIONS

IEEE Std 1149.1™-2001 (R2008) (Revision of IEEE Std 1149.1-1990).*
Dynamic self-invalidation: reducing coherence overhead in shared-memory multiprocessors.Lebeck, A.R. ; Wood, D.A. ; Jun. 22-24, 1995.*

* cited by examiner

*Primary Examiner* — Jeffrey A Gaffin
*Assistant Examiner* — Guerrier Merant
(74) *Attorney, Agent, or Firm* — John R. Pessetto; W. James Brady; Frederick J. Telecky, Jr.

(57) ABSTRACT

A system comprises storage that includes first and second data. The system also comprises circuit logic coupled to the storage. The circuit logic receives a plurality of clock signals. As a result of receiving a signal, the circuit logic uses the plurality of clock signals to obtain the first and second data and to provide the first and second data to target logic coupled to the circuit logic. The system resets the circuit logic between providing the first data and providing the second data.

11 Claims, 24 Drawing Sheets

MAINTAINING DATA COHERENCY IN MULTI-CLOCK SYSTEMS

BACKGROUND

Electronic devices are capable of operating in different clock domains. For example, devices using Joint Test Action Group (JTAG) technology often use multiple clocks (e.g., test clocks (TCK) and functional clocks (FCK)). In many cases, when one of the clock speeds is substantially different from the other clock speeds, data coherency problems result.

SUMMARY

Accordingly, there are disclosed herein various embodiments of a technique by which data coherency problems are mitigated. An illustrative embodiment comprises a system comprising storage that includes first and second data. The system also comprises circuit logic coupled to the storage. The circuit logic receives a plurality of clock signals. As a result of receiving a signal, the circuit logic uses the plurality of clock signals to obtain the first and second data and to provide the first and second data to testing logic coupled to the circuit logic. The system resets the circuit logic between providing the first data and providing the second data.

Another illustrative embodiment includes a method that comprises receiving a first signal from testing logic and, in response to the first signal, using storage logic and a plurality of clock signals to obtain a first data and to provide the first data to the testing logic. The method also comprises receiving a second signal from the testing logic and, in response to the second signal, using the storage logic and the plurality of clock signals to obtain a second data and to provide the second data to the testing logic. The method also comprises resetting the storage logic in between providing the first data and obtaining the second data.

Yet another illustrative embodiment includes a system comprising means for storing used to obtain and output multiple data to other logic external to the means for storing. Each datum is obtained and output as a result of receiving a different request signal from the other logic. The means for storing obtains and outputs the multiple data using multiple clock signals. The system also includes means for resetting the means for storing. The means for resetting maintains data coherency in the means for storing by resetting the means for storing prior to obtainment and output of each datum.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A software developer may use debugging software running on a host computer to test and debug an application stored on test hardware coupled to the host computer. While the application is being tested and debugged, various information is transferred from the hardware to the host computer. The hardware may operate using multiple clocks. For example, the hardware may use a Test Clock (TCK) for testing purposes and a Functional Clock (FCK) for non-testing purposes. Data coherency problems may result on the hardware with the use of multiple clocks, particularly if one of the clock signals is substantially faster or slower than the other clock signals. Accordingly, disclosed herein are various embodiments of a system that mitigates data coherency problems when implemented in test hardware (or other suitable hardware) comprising multiple clocks.

Figure 1:
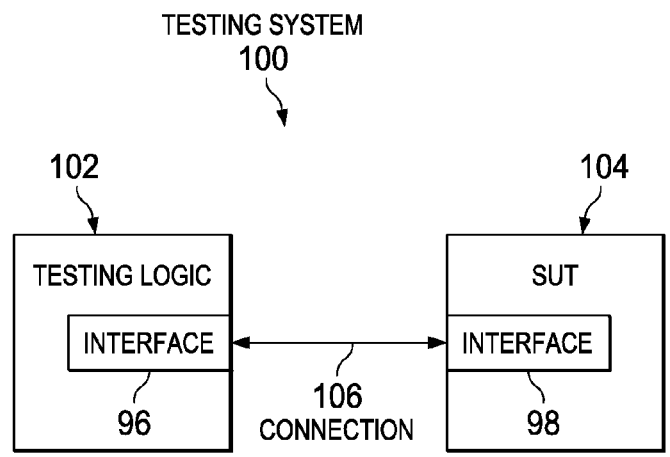
FIG. 1 shows a block diagram of an illustrative testing system, in accordance with various embodiments.

FIG. 1 shows a block diagram of a testing system 100 in accordance with various embodiments. The testing system 100 comprises a testing logic 102 (e.g., an emulator) coupled to test hardware (also referred to as a "system under test," or "SUT") 104 via a connection 106. The connection 106 couples to the testing logic 102 by way of an interface 96, and the connection 106 couples to the SUT 104 by way of an interface (e.g., Joint Test Action Group (JTAG) port) 98. The testing logic 102 comprises various hardware and software components which are used to debug and to verify proper functionality of hardware and/or software components in the SUT 104. Using the connection 106, the testing logic 102 transfers test signals to, and receives result signals from, the SUT 104. The testing logic 102 uses the result signals to, for example, debug software stored on the SUT 104. The result signals may comprise any suitable data (e.g., software performance data, system status information).

Figure 2:
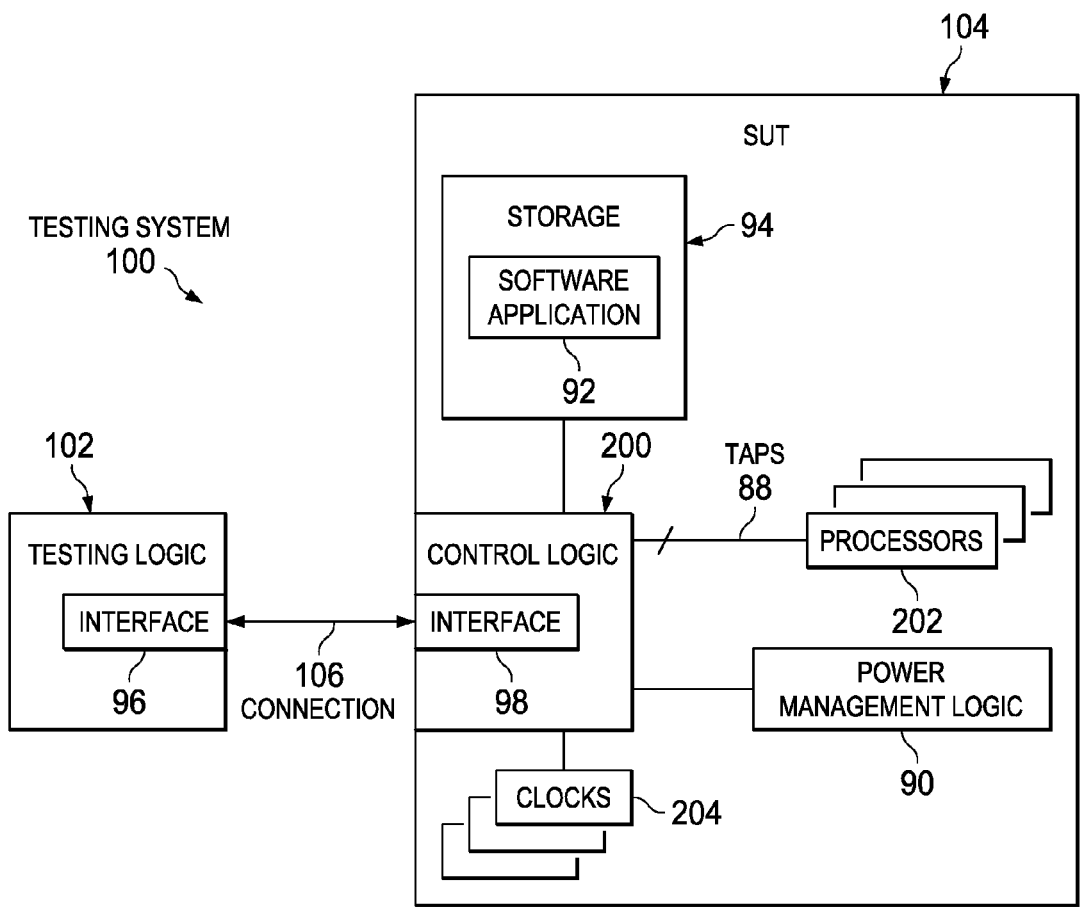
FIG. 2 shows a detailed block diagram of the illustrative testing system of FIG. 1, in accordance with various embodiments.

FIG. 2 shows a detailed version of the block diagram of the testing system 100. The SUT 104 comprises control logic 200 coupled to at least one processor 202 (via at least one Test Access Port (TAP) connection 88) and comprises the interface 98. The SUT 104 also comprises storage 94 comprising a software application 92 that is debugged using the testing logic 102. When executed, the software application 92 causes a processor 202 to program the power management logic 90, which controls the voltage provided to each of the components (or voltage domains) of the SUT 104. The SUT 104 also comprises multiple clocks 204, each of which provides a different clock signal to the circuit logic 200.

As described below in the context of FIGS. 3a-3i, 4a-h and 5a-5f, the circuit logic 200 comprises multiple flip-flops (FFs) that are used to obtain data or system status information from the storage 94 and to provide that data or system status information to the testing logic 102. Because circuit logic 200 uses multiple clocks (as described below), the circuit logic 200 is designed to initialize (e.g., reset) some or all of the FFs in the circuit logic 200 between each instance of data or system status information obtainment. In this way, data coherency problems generally associated with multiple clocks are mitigated. While in some embodiments the FFs are reset each time, in other embodiments, the FFs may be reset at predetermined intervals (e.g., not each time). Other benefits (e.g., avoiding performance penalty) also may be achieved.

Figure 3A:
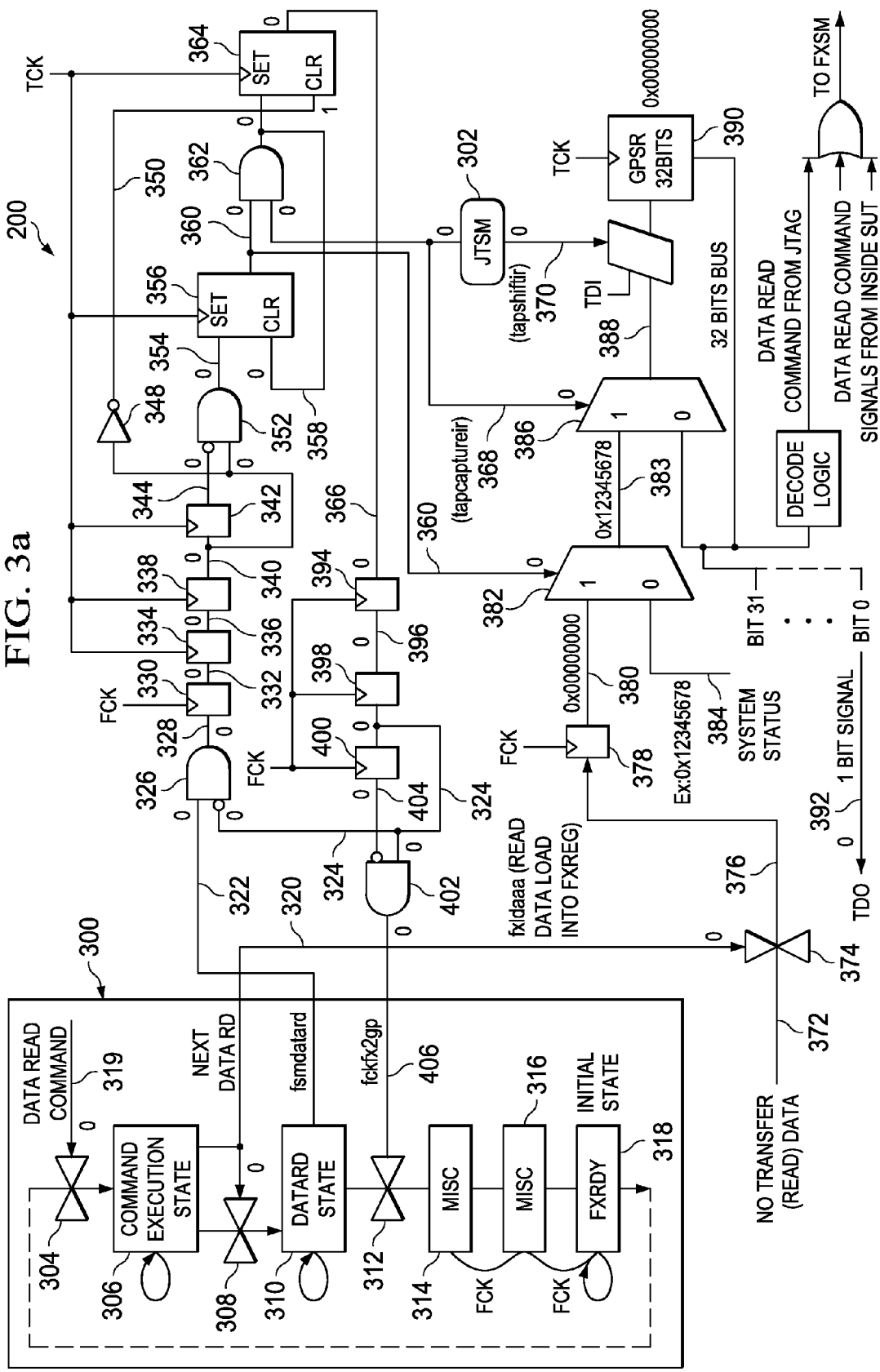
FIGS. 3a-3i show data capture operations as performed by illustrative circuit logic associated with the testing system of FIGS. 1-2, in accordance with preferred embodiments.

FIG. 3a shows an illustrative circuit schematic of the control logic 200 of FIG. 2. As shown in FIG. 3a, the control logic 200 comprises various circuit logic, described below. However, FIG. 3a also shows that the control logic 200 comprises a FCK Data Transfer State Machine (FXSM) 300 and a JTAG Tap State Machine (JTSM) 302. It should be understood that the FXSM 300 and the JTSM 302 are conceptual illustrations of data transfer circuit logic and JTAG circuit logic, respectively. The FXSM 300 and the JTSM 302 have been illustrated in place of the data transfer circuit logic and the JTAG circuit logic for ease and clarity of explanation. Thus, when the FXSM 300 is described herein as performing an action, it is understood that the data transfer circuit logic represented by the FXSM 300 is actually performing that action. When the FXSM 300 is described as being the target of an action, it is understood that the data transfer circuit logic represented by the FXSM 300 is actually the target of that action. Similarly, when the JTSM 302 is described herein as performing an action, it is understood that the JTAG circuit logic represented by the JTSM 302 is actually performing that action. When the JTSM 302 is described herein as being the target of an action, it is understood that the JTAG circuit logic represented by the JTSM 302 is actually the target of that action.

The FXSM 300 comprises a gate 304, a command execution state 306, a gate 308, a data read state 310, a gate 312, miscellaneous states 314 and 316, and a ready state 318. The gate 304 is controlled by a signal (e.g., a data read command) 319. The gate 308 is controlled by a signal 320 generated by the FXSM 300 while in the command execution state 306. The gate 312 is controlled by a signal 406 received from circuit logic as described below. The FXSM 300 transitions from one state to another upon increment of the FCK, unless a gate is provided between the two states. If a gate stands between the two states, a state transition will not occur until the gate is opened. For example, because no gate stands between the states 314 and 316, an increment of the FCK causes the FXSM 300 to transition from the state 314 to the state 316. In contrast, because gate 308 stands between the states 306 and 310, the FXSM 300 will not transition from state 306 to state 310 unless gate 308 is open.

In addition to the data transfer circuit logic represented by the FXSM 300, the circuit logic 200 also comprises an inverted-input AND gate 326. The gate 326 receives as input signal on node 322 from the FXSM 300 while in the data read state 310. The gate 326 also receives an inverted version of a signal on node 324, described below. The gate 326 provides an output onto node 328. The signal on node 328 is input to a flip-flop (FF) 330. The FF 330 is controlled by any suitable clock (e.g., the FCK). Each of FFs 330, 378, 394, 398, 400 and FXSM 300 may be controlled by the same clock (e.g., the FCK). The output of the FF 330 is provided to the node 332. The signal on node 332 is provided to FF 334, which is controlled by TCK, and the output of which is provided to node 336. The signal on node 336 is provided to FF 338, which is controlled by TCK, and the output of which is provided to node 340. The signal on node 340 is provided to FF 342, which also is controlled by TCK, and the output of which is provided to node 344.

The circuit logic 200 also comprises an AND gate 352 with one input being inverted (an "inverted-input AND gate"). The gate 352 receives as input an inverted version of the signal on node 344 and also receives as input the signal on node 340. The gate 352 produces an output signal on node 354 which, in turn, is provided to a SET input of FF 356. The CLR input of FF 356 comprises a signal on node 358, described below. The output of the FF 356 is provided to node 360. An AND gate 362 receives the signal on node 360 as one input and receives the signal on node 368 (described below) as another input. The AND gate 362 produces an output that is provided to node 358. As described above, the signal on node 358 is fed back to the CLR input of FF 356. The signal on node 358 is also provided to a SET input of FF 364. The FF 364 receives via its CLR input the signal on node 350 from node 340 via inverter 348. The output of the FF 364 is provided to node 366. Each of the FFs 334, 338, 342, 356 and 364 is controlled by TCK.

The signal on node 366 is provided to FF 394, the output of which is provided on node 396. In turn, the signal on node 396 is provided to FF 398, the output of which is provided on node 324. The signal on node 324 is provided to FF 400, the output of which is provided on node 404. The signals on nodes 404 and 324 are provided as inputs to AND gate 402, with the signal on node 404 being inverted. The signal on node 324 also is provided to the inverted input to AND gate 326. Each of the FFs 394, 398 and 400 is controlled by FCK. The output of the AND gate 402 is provided on node 406. The signal on node 406 is provided to the gate 312 of FXSM 300.

Data that is accessed from storage (e.g., a register or other type of memory location) is retrieved and provided on node 372. A signal on node 372 is separated from node 376 by a gate 374, which is controlled by a signal on node 320. In some embodiments, the gate 374 may comprise a multiplexer, with one of its inputs coupled to the output of the FF 378. The signal on node 376 is provided to FF 378, which is controlled by the FCK. The FF 378 outputs a signal on node 380. A multiplexer (MUX) 382 receives a signal (e.g., data signal) on node 380 and a signal on node 384 (e.g., system status signal). The MUX 382 also receives a control signal on node 360. Depending on the status of the control signal on node 360, the MUX 382 permits either the signal on node 380 or the signal on node 384 to pass through the MUX 382. The signal output by the MUX 382 is provided to node 383. The node 383 is separated from node 388 by gate 386, which is controlled by the signal on node 368. The signal 368 (tapcaptureir, explained below) is a pulse signal of one TCK cycle. At about the same time that the signal 368 goes from "1" to "0," the signal 370 goes from "0" to "1." The value of the signal 370 is held until completion of the data shift-out operation of the output register. The signal on node 383 is provided to FF 390, which is controlled by the TCK, unless the gate/multiplexer 386 prevents this from occurring. The FF 390 can execute a 1-bit data shift operation to shift the data out on the node 392 (i.e., send the result signal to the testing logic 102) when the signal on node 368 is "0," which is controlled by the signal on node 370 and by the TCK. The JTSM 302 generates multiple signals and is controlled by TCK. In at least some embodiments, the JTSM 302 generates the signal on node 368 (referred to as "tapcaptureir"). The JTSM 302 also generates the signal on node 370 (referred to as "tapshiftir").

The operation of the circuit logic 200 is now described. Still referring to FIG. 3a, the initial state of the FXSM 300 is the ready state 318. The FXSM 300 stays in this ready state 318 until a data read command is received on node 319 (e.g., from the testing logic 102), thereby opening the gate 304 and enabling the FXSM 300 to transition from the ready state 318 to the command execution state 306. The statuses of some of the nodes in the FXSM 300 and other portions of the circuit logic 200 are shown in FIG. 3a.

Figure 3B:
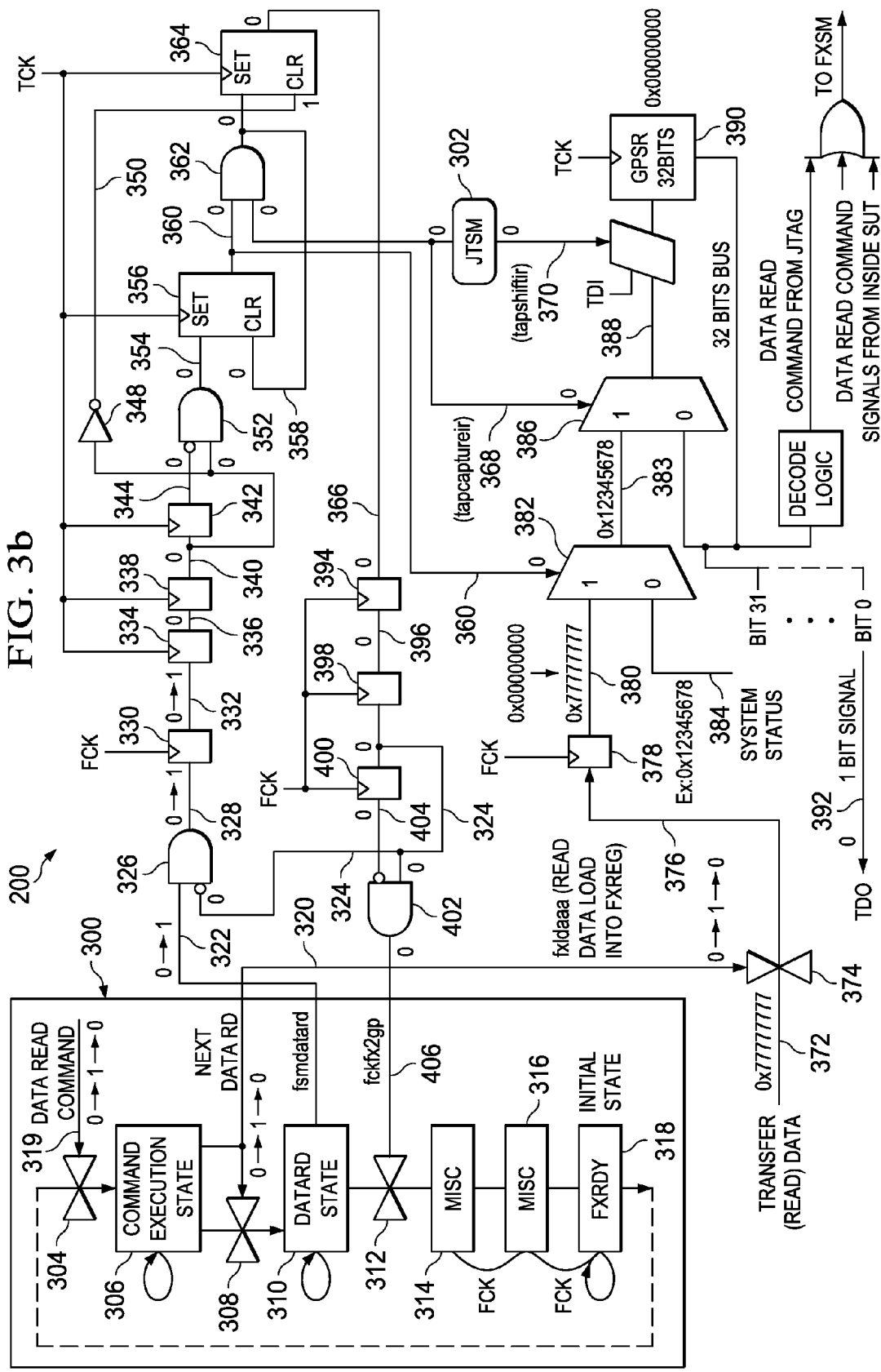

FIG. 3b shows the next state of the circuit logic 200 when the data read command on node 319 is asserted. When the signal on node 319 is asserted, the gate 304 opens, thereby enabling the FXSM 300 to transition from the ready state 318 to the command execution state 306. The signal on node 319 preferably is a pulse signal, so that as soon as the FXSM 300 has transitioned to the command execution state 306, the gate 304 is closed.

In the command execution state 306, the FXSM 300 provides a pulse signal on the node 320, as shown. The pulse signal on node 320 causes the gate 308 to open, thereby enabling the FXSM 300 to transition from the command execution state 306 to the data read state 310. The pulse signal on node 320 also causes the gate 374 to open and then close, thereby enabling data read from a predetermined memory location to be provided to the FF 378. When the state of FXSM 300 moves to the data read state 310, at about the same time/cycle, the data (e.g., 0x77777777) on node 372 is passed through the gate 374 to the node 376, where it is captured and output by the FF 378 to the node 380.

In the data read state 310, the FXSM 300 asserts the signal on node 322, as indicated in FIG. 3b. Because the status of node 324 is "0," and because the status of node 322 is now "1," the AND gate 326 outputs a "1" on node 328. In turn, the FF 330 captures and outputs the "1" from node 328 to the node 332. Meanwhile, the data (0x77777777) on node 372 is passed through the gate 374 to the node 376, where it is captured and output by the FF 378 to the node 380. The FF 330 is able to capture and output data regardless of the state of FXSM 300. The FF 378 keeps the data (e.g., 0x77777777) while the FXSM 300 is in the data read state 310. The FXSM 300 remains in the data read state 310 until the gate 312 is opened by a signal on the node 312.

Figure 3C:
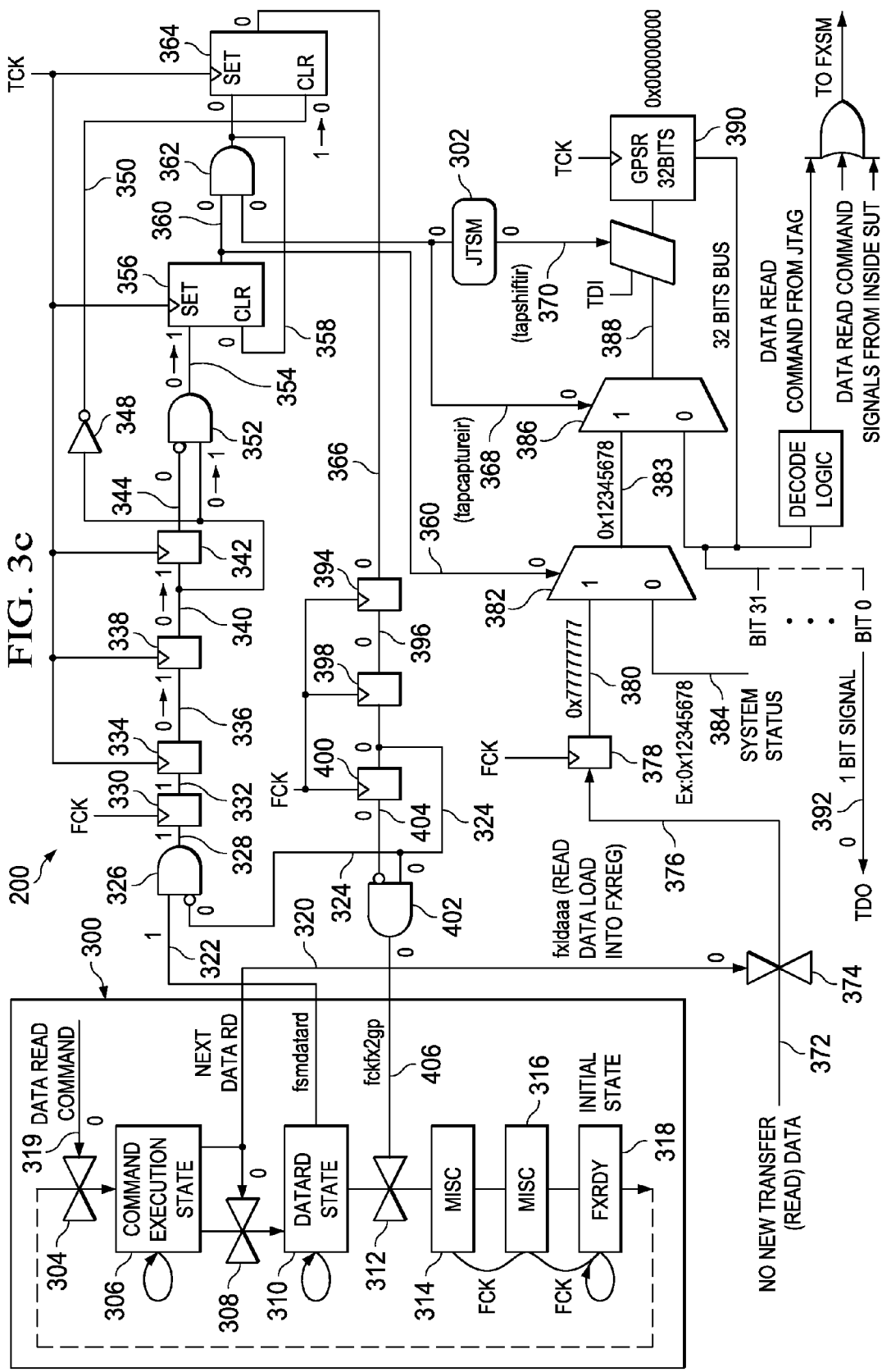

Referring now to FIG. 3c, while TCK and FCK continue to increment and the FXSM 300 remains in the data read state 310, the statuses of various nodes in the circuit logic 200 continue to be adjusted. More specifically, the FF 334 captures the "1" on node 332 and outputs the "1" onto node 336. In turn, the FF 338 captures the "1" on node 336 and outputs the "1" onto node 340. Because the node 340 changes state from "0" to "1," the output of the AND gate 352 becomes "1," as indicated in FIG. 3c. Further, because the node 340 changes state from "0" to "1," the CLR input to the FF 364 changes state from "1" to "0," due to the inverter 348.

Figure 3D:
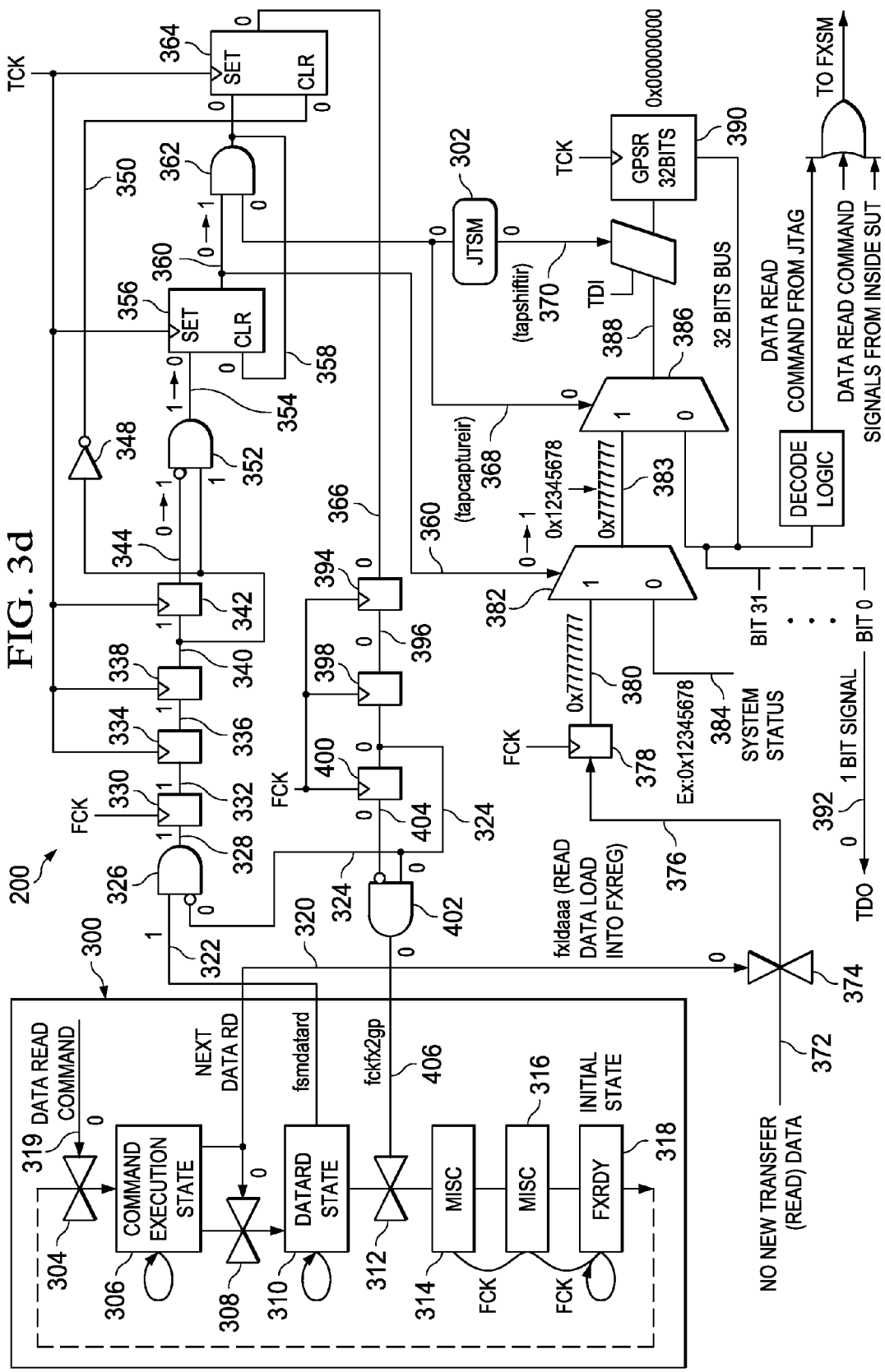

Referring now to FIG. 3d, the TCK and FCK continue to increment while the FXSM 300 remains in the data read state 310. As a result, the FF 342 captures the "1" on the node 340 and outputs a "1" on node 344. In turn, the AND gate 352 outputs a "0" on node 354. At about the same time/cycle the FF 356 is set to "1," its output on node 360 changes state from "0" to "1." As a result, the MUX 382 outputs the signal on node 380 (i.e., the data 0x77777777) onto the node 383.

Figure 3E:
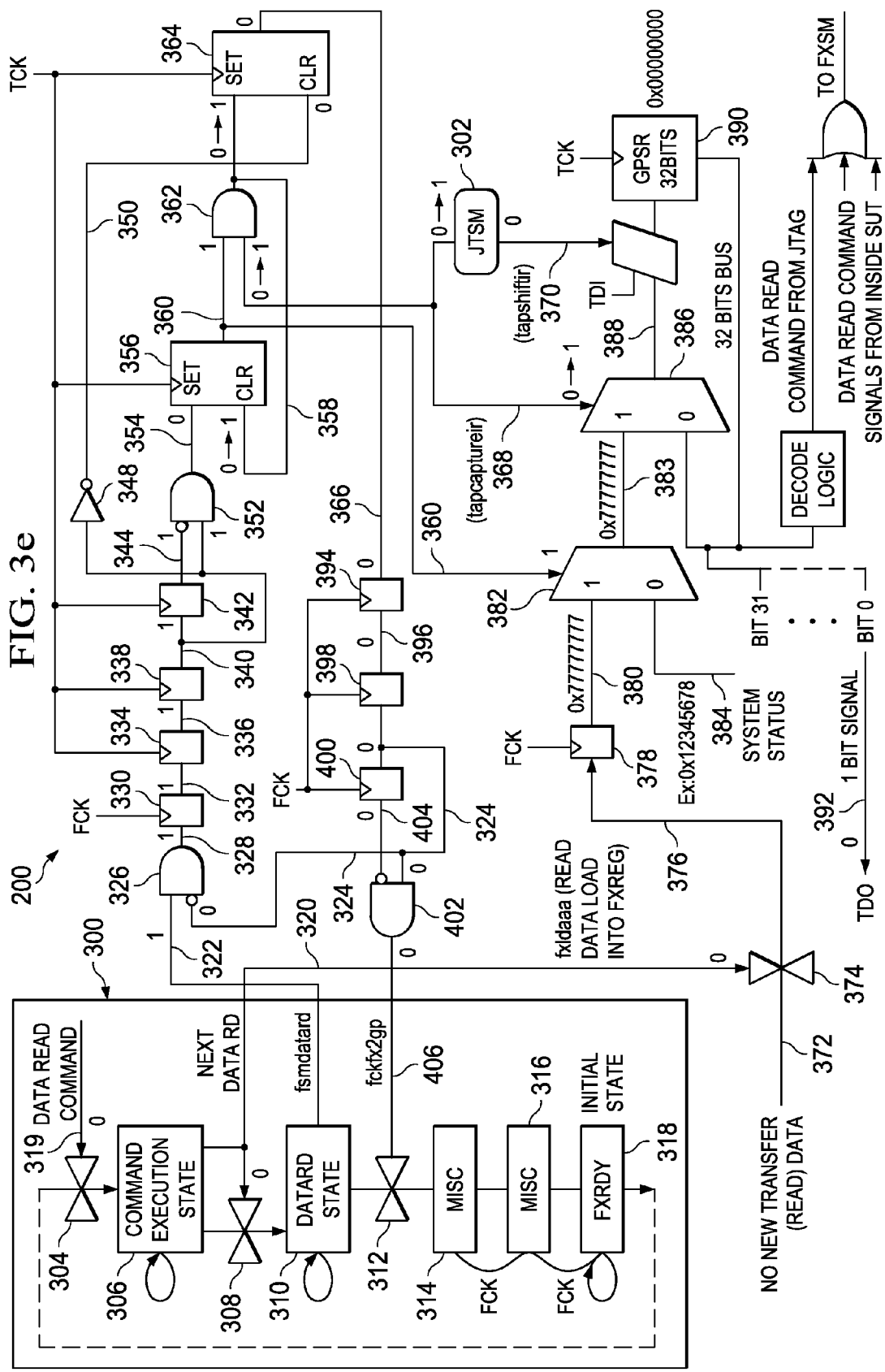

Referring now to FIG. 3e, the TCK and FCK continue to increment while the FXSM 300 remains in the data read state 310. The JTSM 302 asserts the signal tapcaptureir (e.g., a pulse of 1 TCK cycle) on node 368. Because both inputs to the AND gate 362 become "1," the gate 362 outputs a "1" onto node 358, thereby setting the FF 364, as indicated in FIG. 3e. Thus, as a result, the CLR input to FF 356 also becomes "1," thereby clearing the FF 356. Further, asserting the tapcaptureir on node 368 also causes the gate 386 to be opened, thereby permitting the data on node 383 (0x77777777) to be passed to the node 388.

Figure 3F:
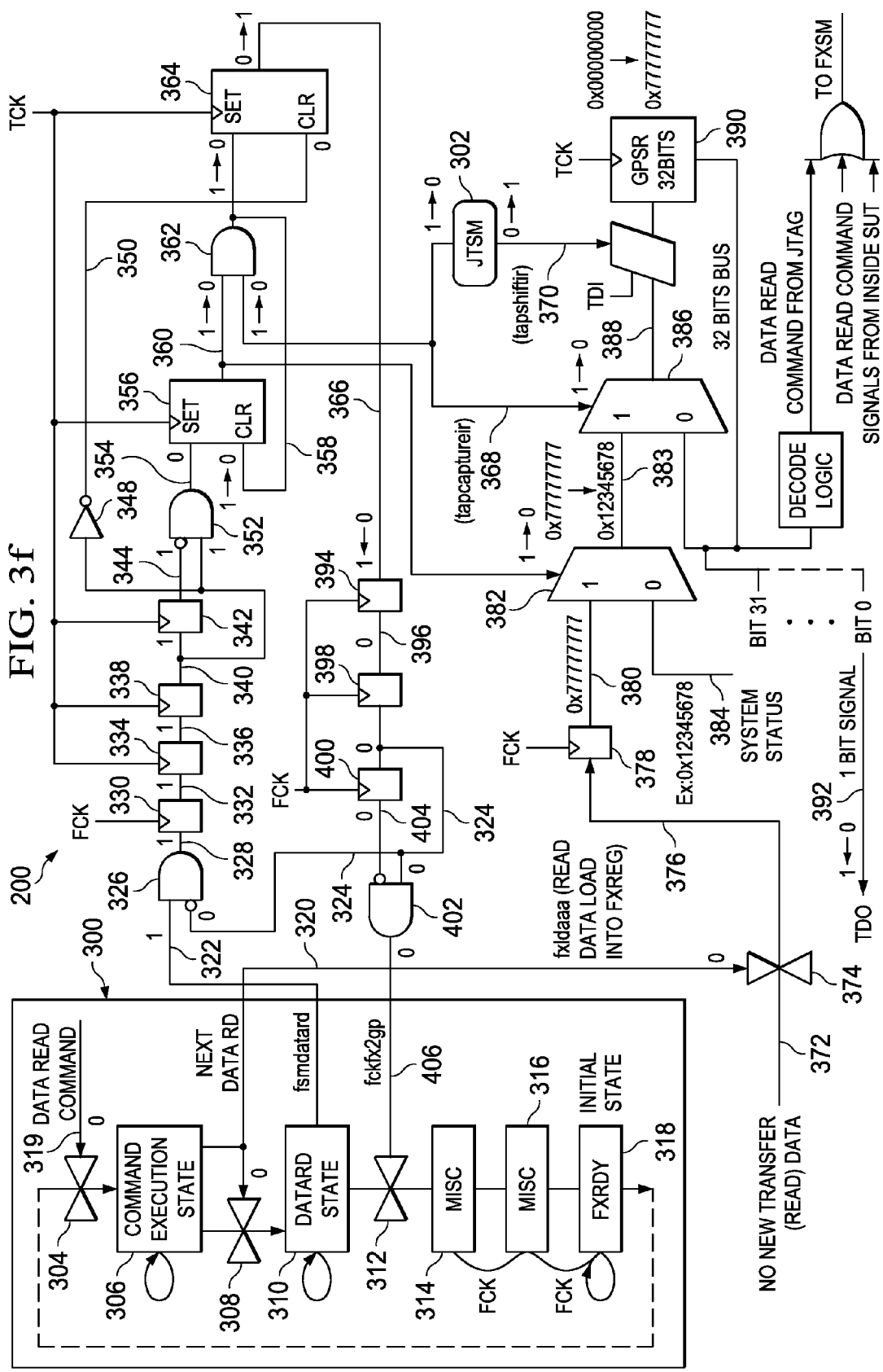

Referring now to FIG. 3f, the TCK and FCK continue to increment while the FXSM 300 remains in the data read state 310. The output of FF 364 becomes "1" and the output of FF 356 becomes "0," thereby causing the output of the AND gate 362 to become "0," the CLR input to FF 356 to become "0" and the SET input to FF 364 to become "0." It also enables the MUX 382 to permit the signal on node 384 to pass through. As a result, the signal on node 383 becomes "0x12345678." At about the same time/cycle, the signal 0x77777777 on node 388 is captured by the FF 390 for subsequent output to the testing logic 102. The LSB (Least Significant Bit) data of FF 390 appears on node 392. Now, the LSB data of 0x77777777 is "1." Meanwhile, the JTSM 302 de-asserts the tapcaptureir signal on node 368 to "0" and asserts the tapshiftir signal on node 370. As a result, the gate 386 is closed and the data 0x77777777 of FF 390 is ready to be shifted out.

Figure 3G:
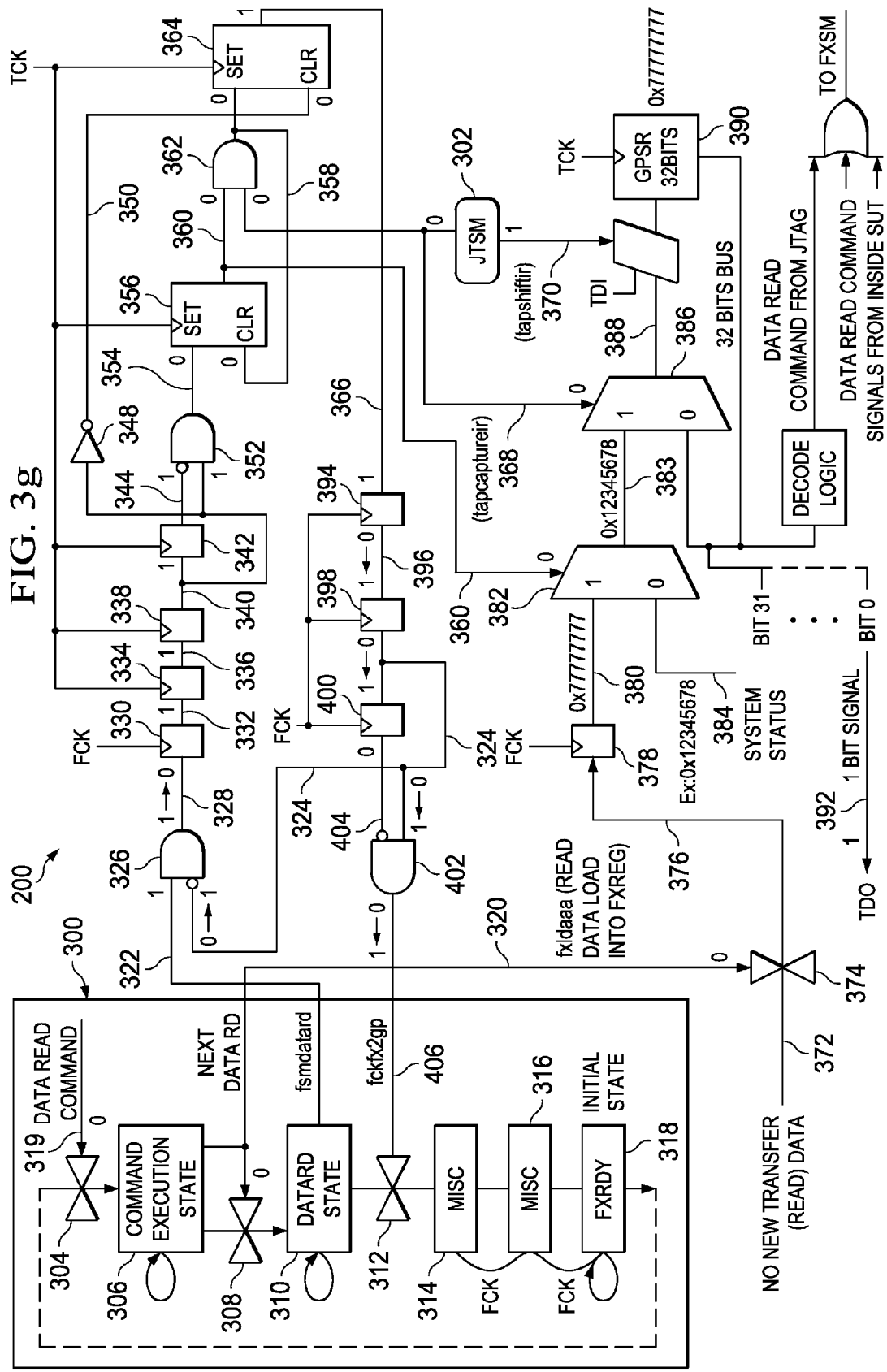

Referring to FIG. 3g, the TCK and FCK continue to increment while the FXSM 300 remains in the data read state 310. The signal "1" on node 366 is captured by the FF 394 and output onto the node 396. In turn, the signal "1" on node 396 is captured by the FF 398 and output onto the node 324. Because the node 324 is "1" and node 404 is "0," the output of the AND gate 402 becomes "1," thereby opening the gate 312 and allowing the FXSM 300 to transition from the data read state 310 to miscellaneous state 314. The change of node 324 from "0" to "1" causes the node 328 to switch from "1" to "0."

Figure 3H:
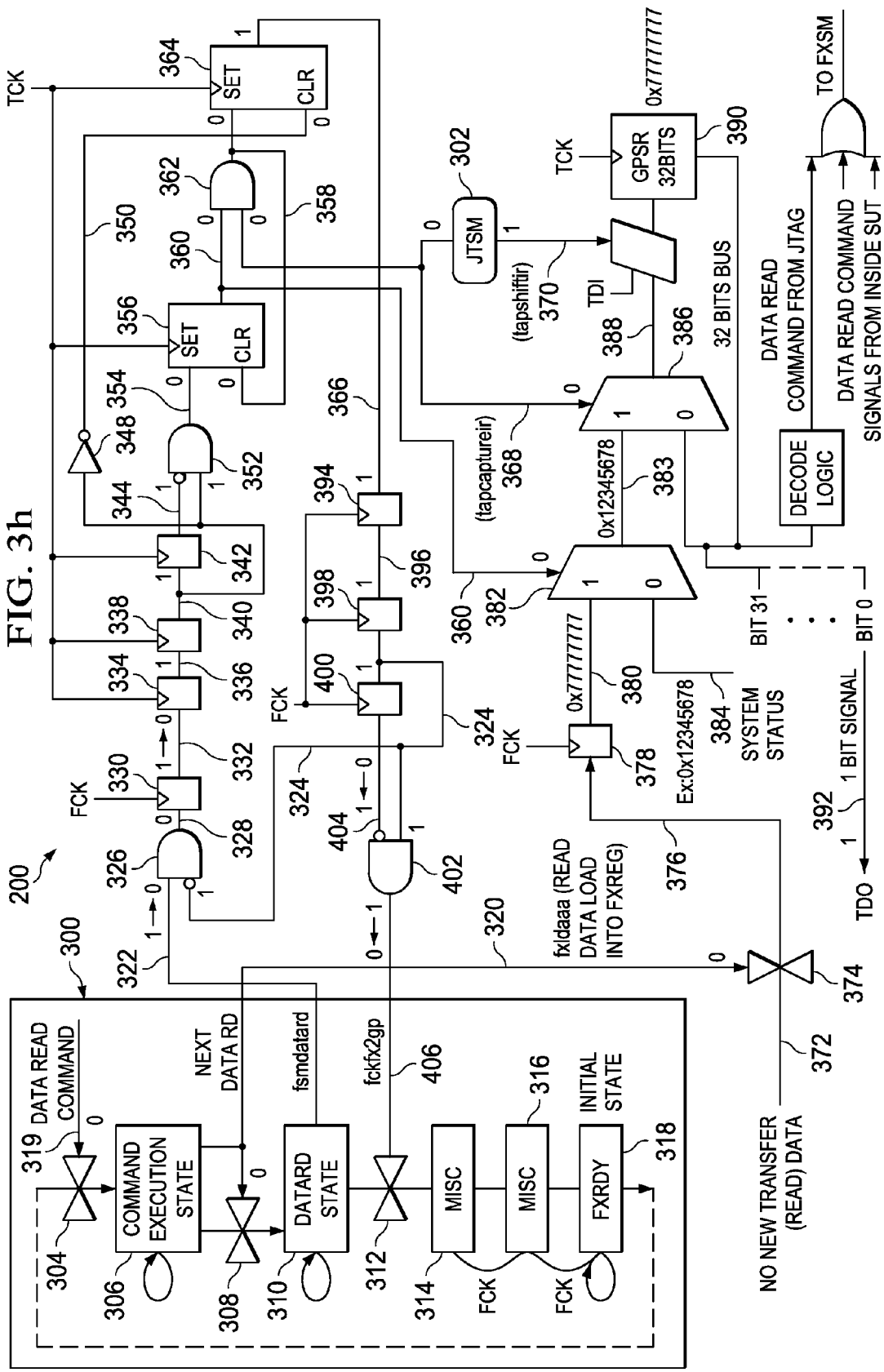

Referring to FIG. 3h, the following functions occur at about the same time/cycle: the FXSM 300 moves into the miscellaneous state 314 and the node 322 becomes "0." The node 328 already is "0" due to the "1" on node 324 before the node 322 becomes "0." Further, the FF 330 captures the "0" (FIG. 3g) on node 328 and outputs "0" onto node 332. Further yet, the FF 400 captures the "1" on node 324 and outputs the "1" onto node 404, thereby causing the output of the AND gate 402 on node 406 to change to "0." The gate 312 is then closed.

Figure 3I:
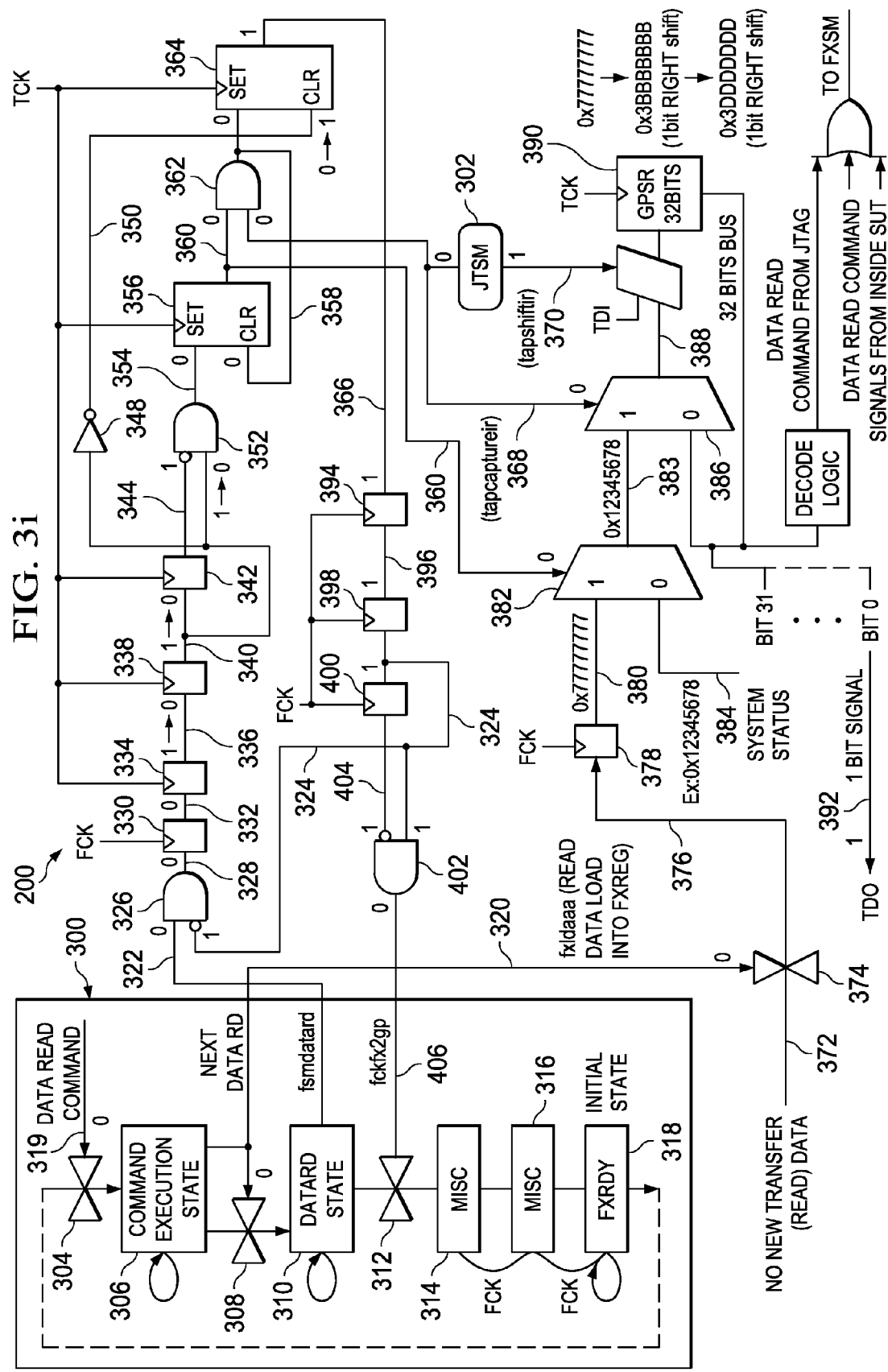

Referring now to FIG. 3i, an increment of FCK causes the FXSM 300 to transition from the miscellaneous state 314 to the miscellaneous state 316. In turn, another increment of FCK causes the FXSM 300 to transition from the miscellaneous state 316 to the ready state 318. The TCK and FCK continue to increment while the FXSM 300 remains in the ready state 318. While the FXSM 300 is in the ready state 316, the FF 334 captures the "0" on the node 332 and outputs the "0" onto node 336 by an increment of TCK. At the same time/cycle, the data of FF 390 is shifted out (e.g., a 1 bit right shift by TCK). As a result, the data of FF 390 becomes "0x3BBBBBBB." In turn, the FF 338 captures the "0" on node 336 and outputs the "0" onto node 340 by an increment of TCK. This causes the CLR input to the FF 364 to change from "0" to "1," thereby clearing the FF 364. At about the same time/cycle, the data of FF 390 is shifted out (e.g., a 1 bit right shift by TCK). As a result, the data of FF 390 becomes "0x1DDDDDDD."

As described above, FIGS. 3a-3i show the capture and output of data from storage upon the receipt of a data read command from the testing logic 102. As described, prior to fulfilling each data read request or system status request, the circuit logic 200 initializes (i.e., resets) at least some of the FFs contained therein. In this way, data coherency problems generally associated with multi-clock systems are mitigated. FIGS. 4a-4h show the capture and output of additional data from storage upon the receipt of another data read command from the testing logic 102 or from other suitable sources. The data read command may be issued by the testing logic 102 and provided to the SUT 104 (e.g., logic inside the SUT 104 such as an ICEMaker® (not specifically shown)) using, for example, a shifting process. The decoded data read command signal 319 is asserted into the FXSM 300. Data is then read from the storage (e.g., memory, register). The result (e.g., data read, status) is transferred to the testing logic 102 (e.g., using a shifting process). At about the same time the result is transferred out of the SUT 104, a new data read command is received from the testing logic 102. In some embodiments, instead of receiving a new data read command from the testing logic 102, the data read command is received from some internal source within the SUT 104 and is provided to a suitable logic, such as the ICEMaker®, within the SUT 104. This provision may be achieved using the FCK. The decoded data read command subsequently is asserted into the FXSM 300. Data is read from storage (e.g., memory, register). The result (e.g., read data, status) is transferred to the testing logic 102 by shifting it out from the SUT 104. At about the same time the result is shifted out of the SUT 104, a new data read command may either be shifted in from the testing logic 102 or from the aforementioned internal source within the SUT 104 (e.g., using FCK).

As shown in FIGS. 4a-4h, while the result data (e.g., read data) is transferred to the testing logic 102, a next data read command is issued from within the SUT 104 and provided to suitable logic within the SUT 104 (e.g., ICEMaker®; using some dedicated interface and FCK). The decoded data read command 319 is asserted into the FXSM 300. Data is then read from the storage (e.g., memory, register). The new result (e.g., data read) is loaded into the FF 390 after completing the transfer of the previous result to the testing logic 102. FIGS. 5a-5f show the capture and output of system status information. Specifically, while the result data (e.g., read data) is transferred to the testing logic 102, no next data read command is issued. The tapcaptureir signal is generated by a JTAG TAP state machine (not specifically shown) after completing transfer of the previous result to the testing logic 102. Thus, as a result, the system status is loaded into the FF 390 as a new result is transferred to the testing logic 102. FIGS. 4a-4h and FIGS. 5a-5f are now discussed in turn.

Figure 4A:
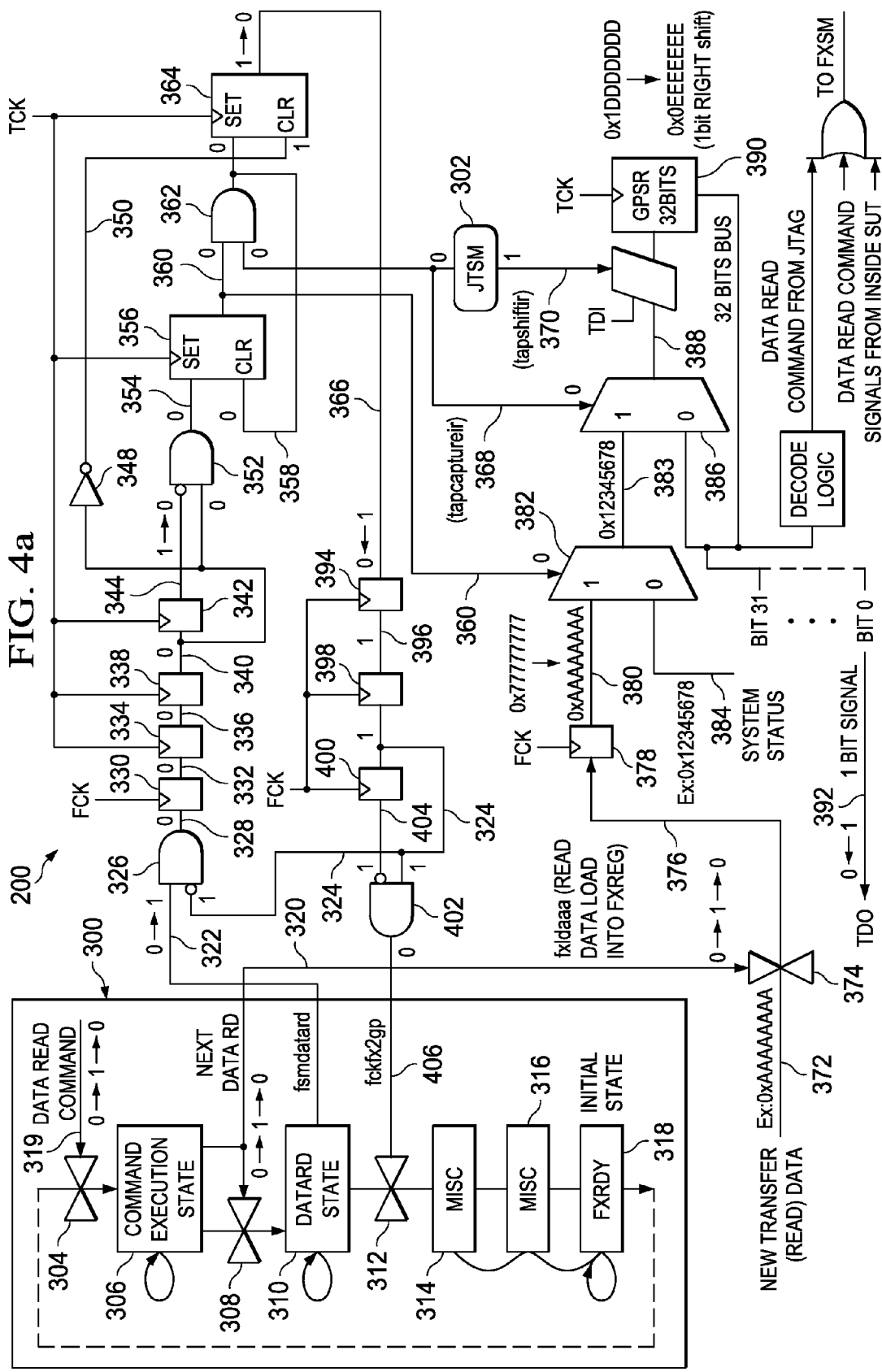
FIGS. 4a-4h also show data capture operations as performed by the illustrative circuit logic of FIGS. 3a-3i, in accordance with various embodiments.

Referring to FIG. 4a, while the FXSM 300 is in the ready state 318, a data read command pulse signal is received that causes the FXSM 300 to transition from the ready state 318 to the command execution state 306. While in the command execution state 306, the FXSM 300 generates a data read pulse signal on node 320, thereby causing the FXSM 300 to transition to the data read state 310 and causing the data signal 0xAAAAAAAA on node 372 to pass through gate 374 to node 376. Upon increment of FCK, the FXSM 300 moves to the data read state 310 and the FF 378 captures the signal 0xAAAAAAAA on node 376 and outputs the signal 0xAAAAAAAA on node 380. Meanwhile, while the FXSM 300 is in the data read state 310, the FXSM 300 outputs a "1" on node 322. Upon increment of TCK, the FF 342 captures the "0" on node 340 and outputs the "0" onto node 344. At about the same time/cycle, the FF 364 captures the "1" signal on the CLR input and, as a result, outputs a "0" on node 366, and the data of FF 390 is shifted out (e.g., 1 bit right shift by a TCK). As a result, the data of FF 390 becomes "0x0EEEEEEE," thereby causing the output of FF 390 on node 406 to change to "0."

Figure 4B:
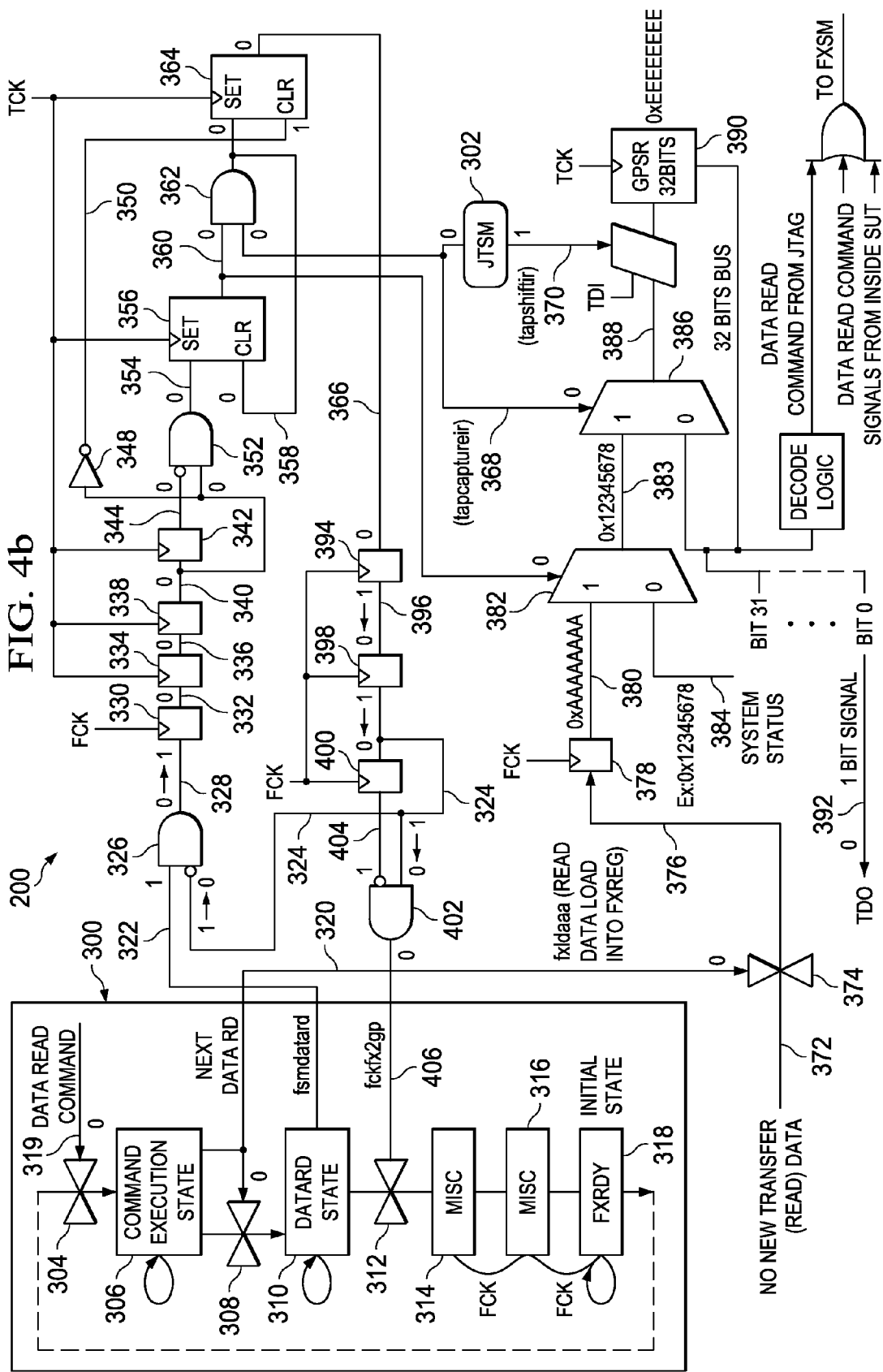

Referring to FIG. 4b, while the FXSM 300 is still in the data read state 310, the "0" signal on node 366 is propagated through the FFs 394 and 398 so that a signal "0" is present on the node 324. As a result, the AND gate 326 outputs a "1" onto node 328.

Figure 4C:
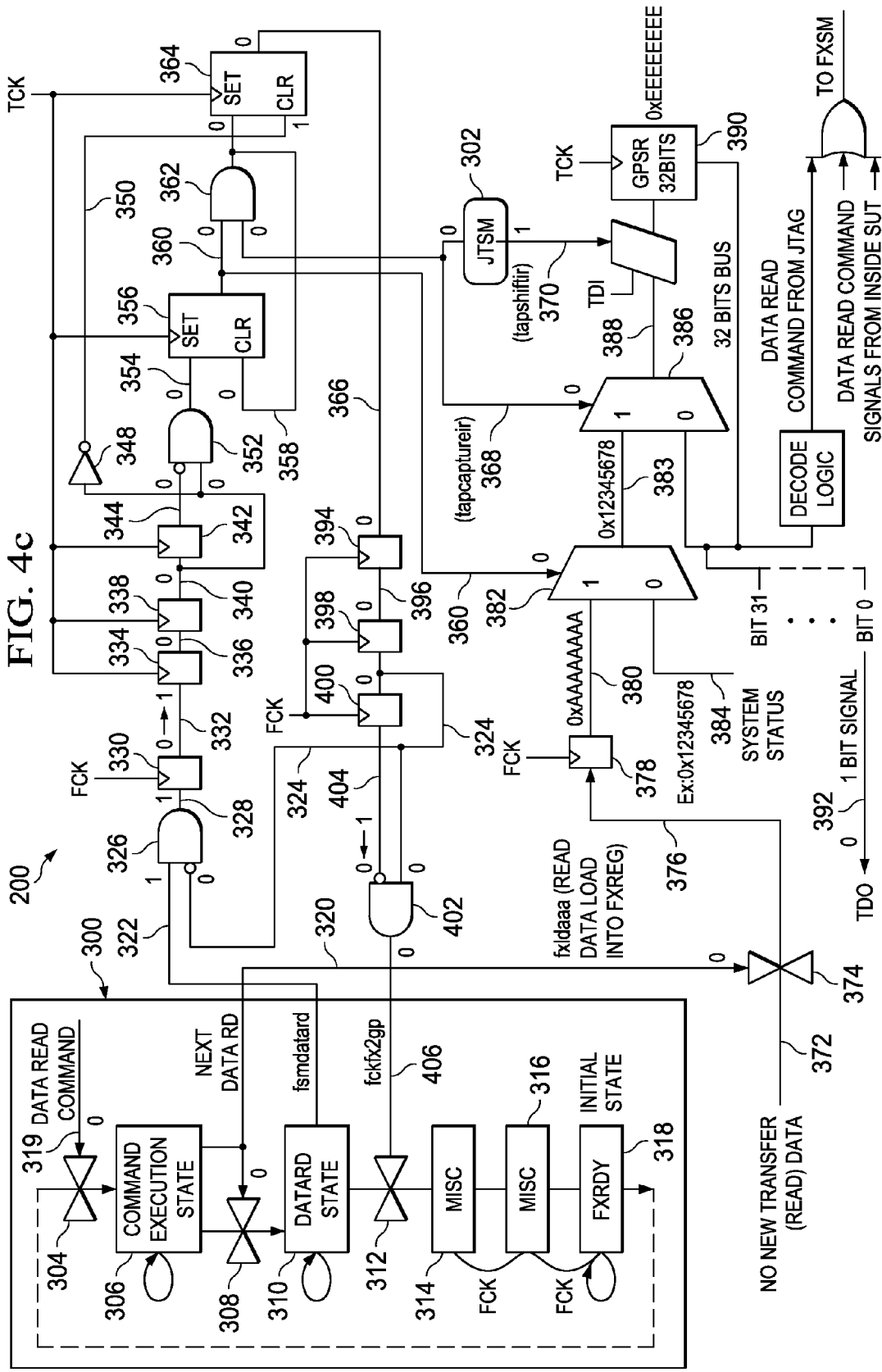

Referring to FIG. 4c, while the FXSM 300 is still in the data read state 310, the signal "1" on node 328 is captured and output by FF 330 onto node 332. The signal "0" on node 324 is captured and output onto node 404 by FF 400.

Figure 4D:
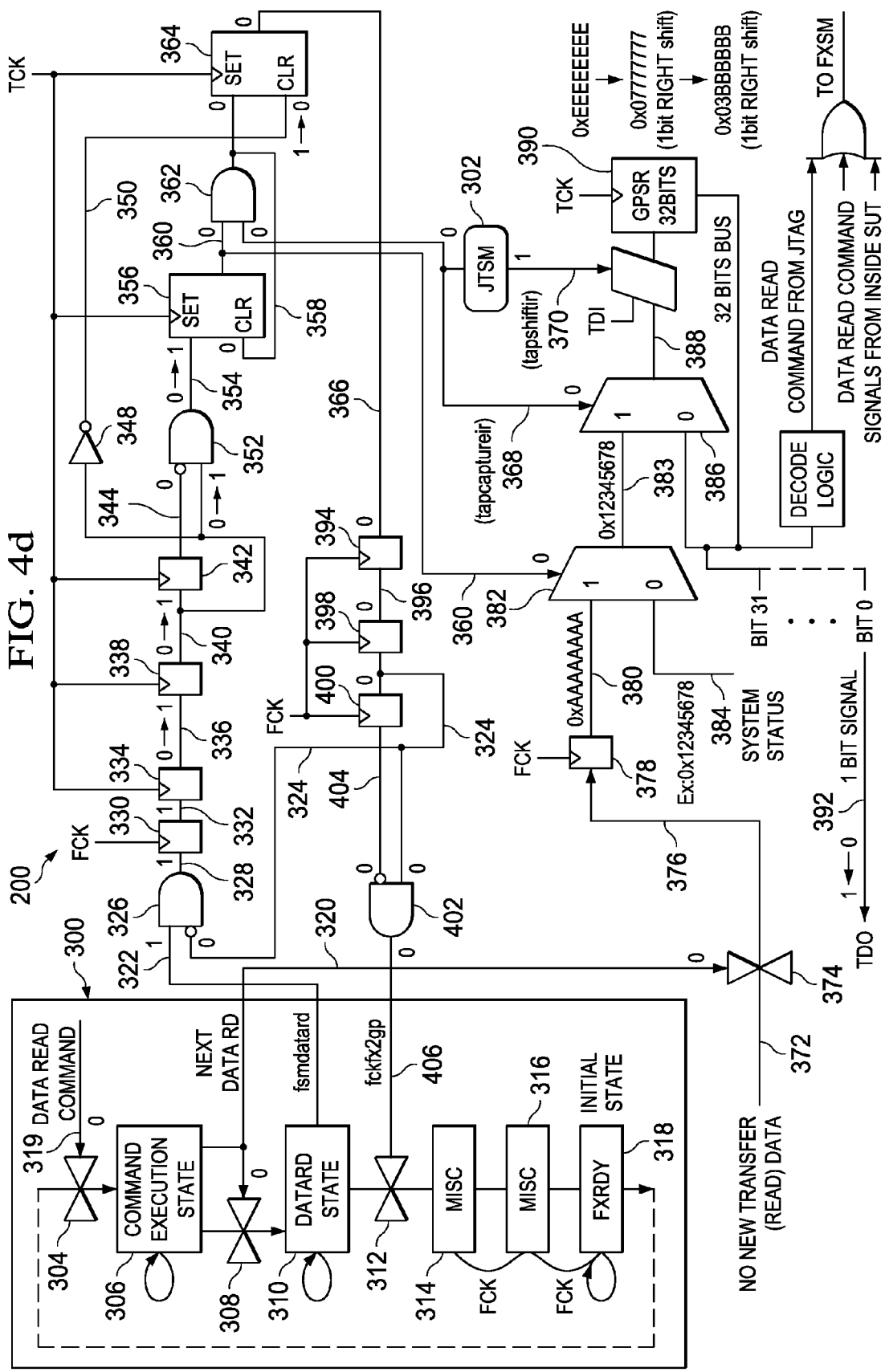

Referring to FIG. 4d, while the FXSM 300 is still in the data read state 310, the "1" on node 332 is propagated through the FFs 334 and 338 onto node 340. As a result, the output of the AND gate 352 on node 354 changes from "0" to "1." The CLR input to the FF 364 also changes from "1" to "0." The TCK increments twice. The data of FF 390 is shifted from 0x0EEEEEEE to 0x07777777, and then 0x03BBBBBB at about the same time as the FFs 334 and 338 are updated. Because the node 392 is an output of the least significant bit (LSB) of the FF 390, it transitions from "0" to "1" and then holds the "1."

Figure 4E:
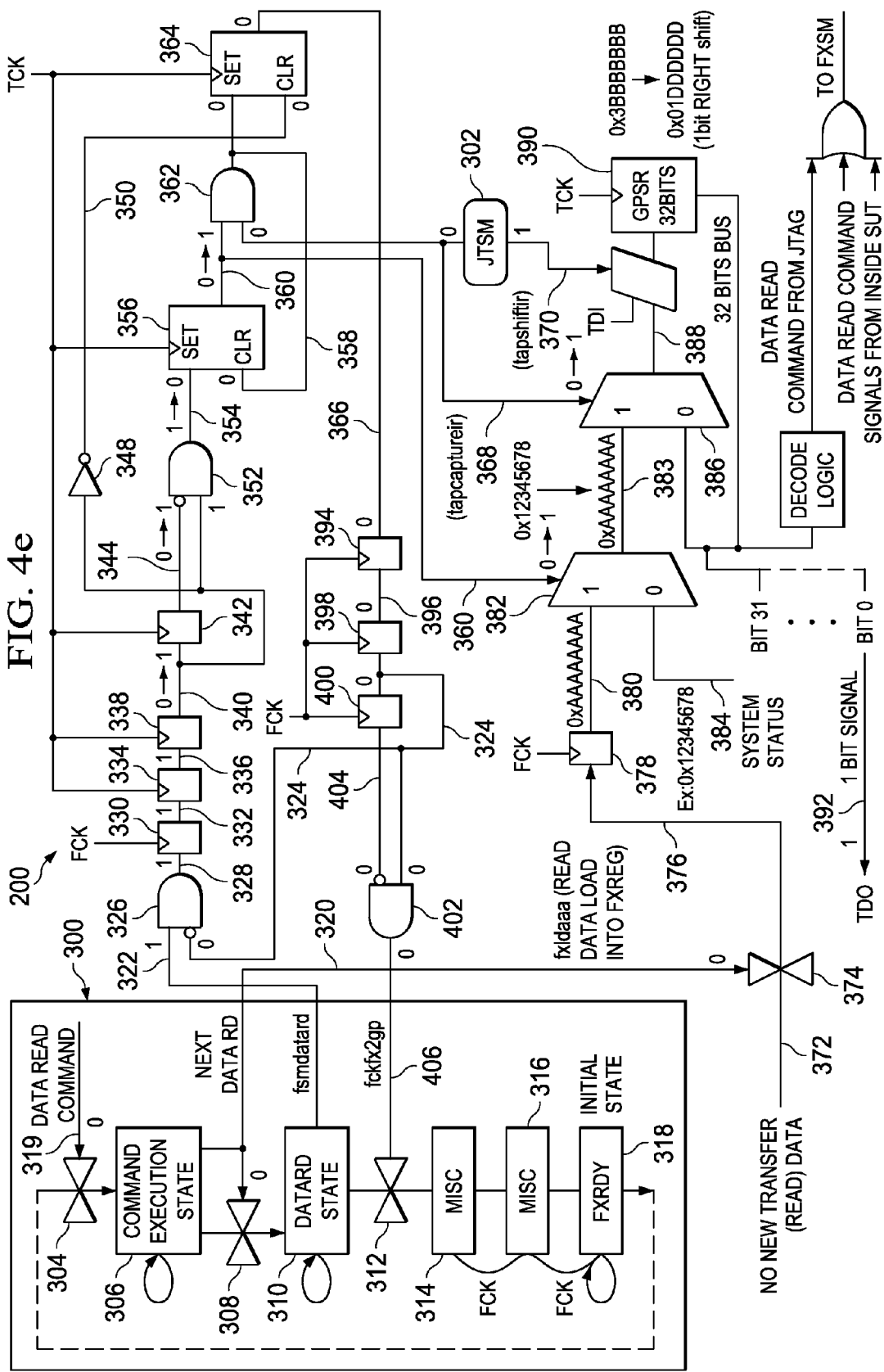

Referring to FIG. 4e, while the FXSM 300 is still in the data read state 310, the "1" on node 340 is captured by the FF 342 and output onto node 344, thereby causing the output of the AND gate 352 to become "0" (i.e., on node 354). At about the same time/cycle, the data of FF 390 is shifted out (e.g., 1 bit right shift by TCK), thereby causing the data of FF 390 to become "0x01DDDDDD," and the FF 356 is set to "1" and its output on node 360 changes state from "0" to "1." As a result, the MUX 382 ceases permitting the signal 0x12345678 on node 384 to pass through and, instead, permits the data signal 0xAAAAAAAA on node 380 to pass through to node 383.

Figure 4F:
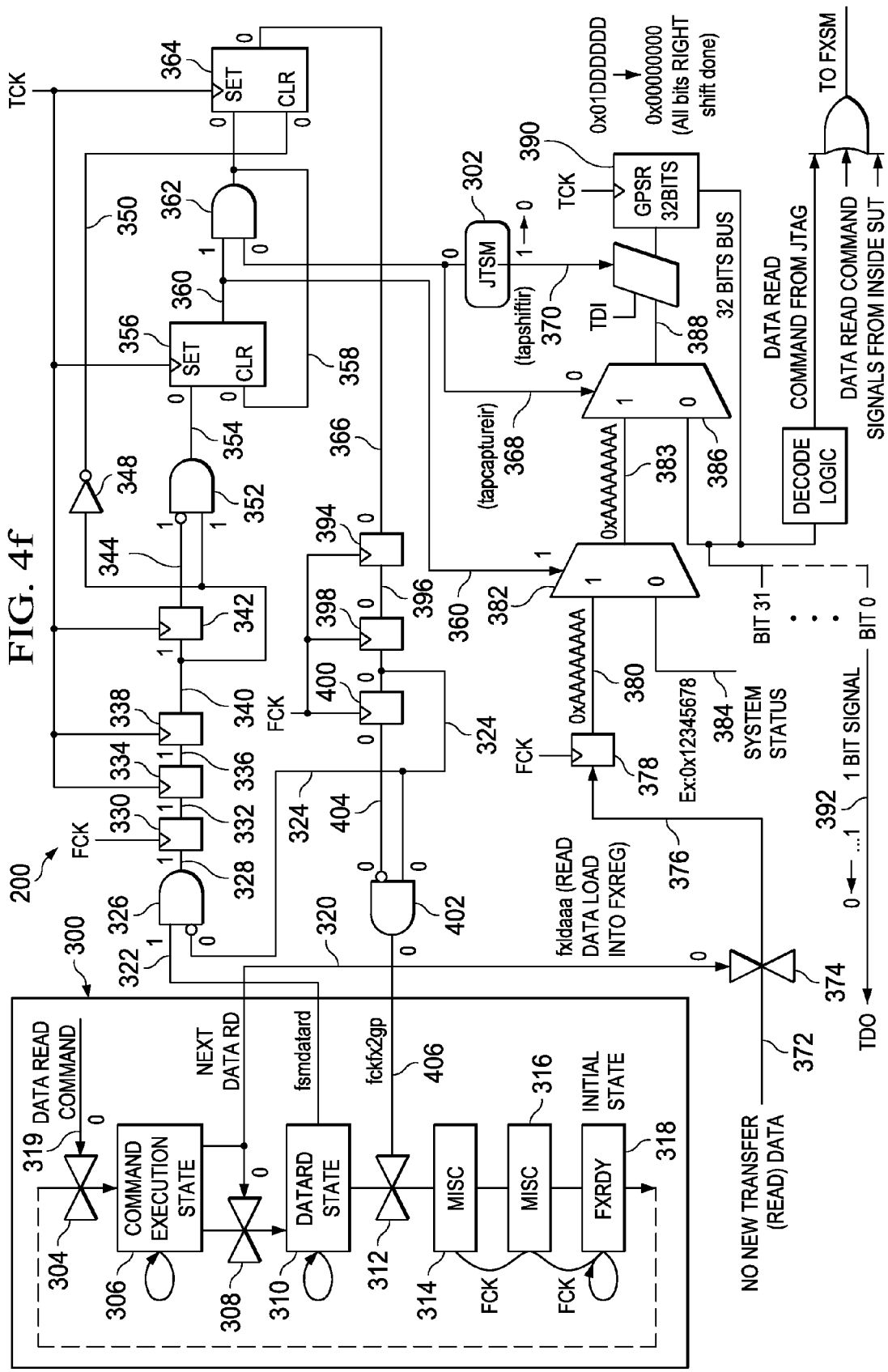

Referring to FIG. 4f, while the FXSM 300 is still in the data read state 310, the TCK and FCK continue to increment and to shift the captured data (e.g., read data) of FF 390 out. The JTSM 302 causes the tapshiftir signal on node 370 to become "0" as soon as the captured data (e.g., read data) of FF 390 is transferred to the testing logic 102. As a result, the FF 390 is updated with new command data "0x00000000."

Figure 4G:
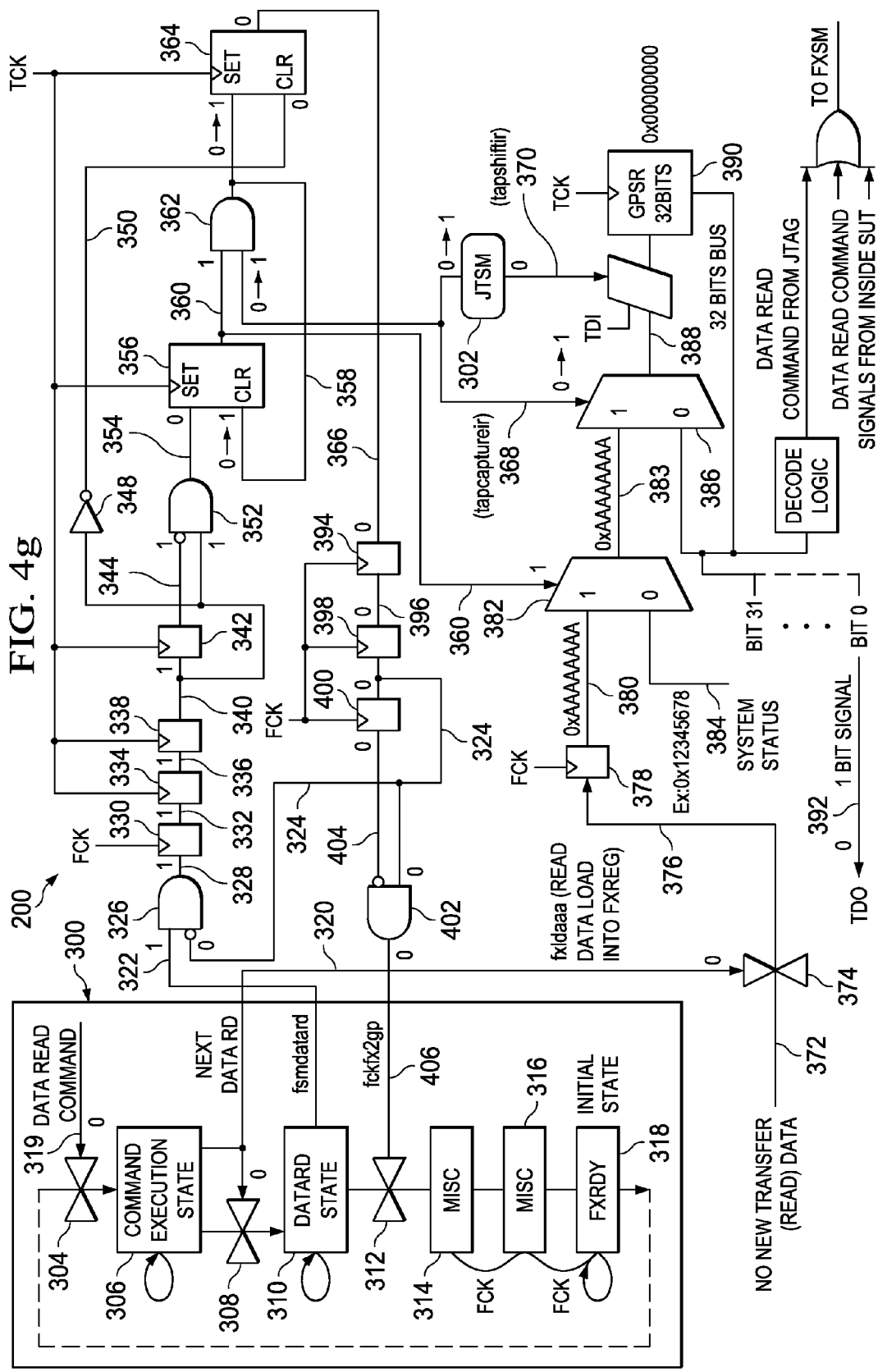

Referring to FIG. 4g, while the FXSM 300 is still in the data read state 310, the JTSM 302 causes the tapcaptureir signal on node 368 to transition from "0" to "1." As a result, the AND gate 362 outputs a "1" onto node 358, thereby causing the CLR input to the FF 356 to change to "1," thereby clearing the FF 356. The transition of node 368 from "0" to "1" also causes the gate 386 to open, thereby causing the data signal 0xAAAAAAAA on node 383 to pass through the gate 386 to the node 388.

Figure 4H:
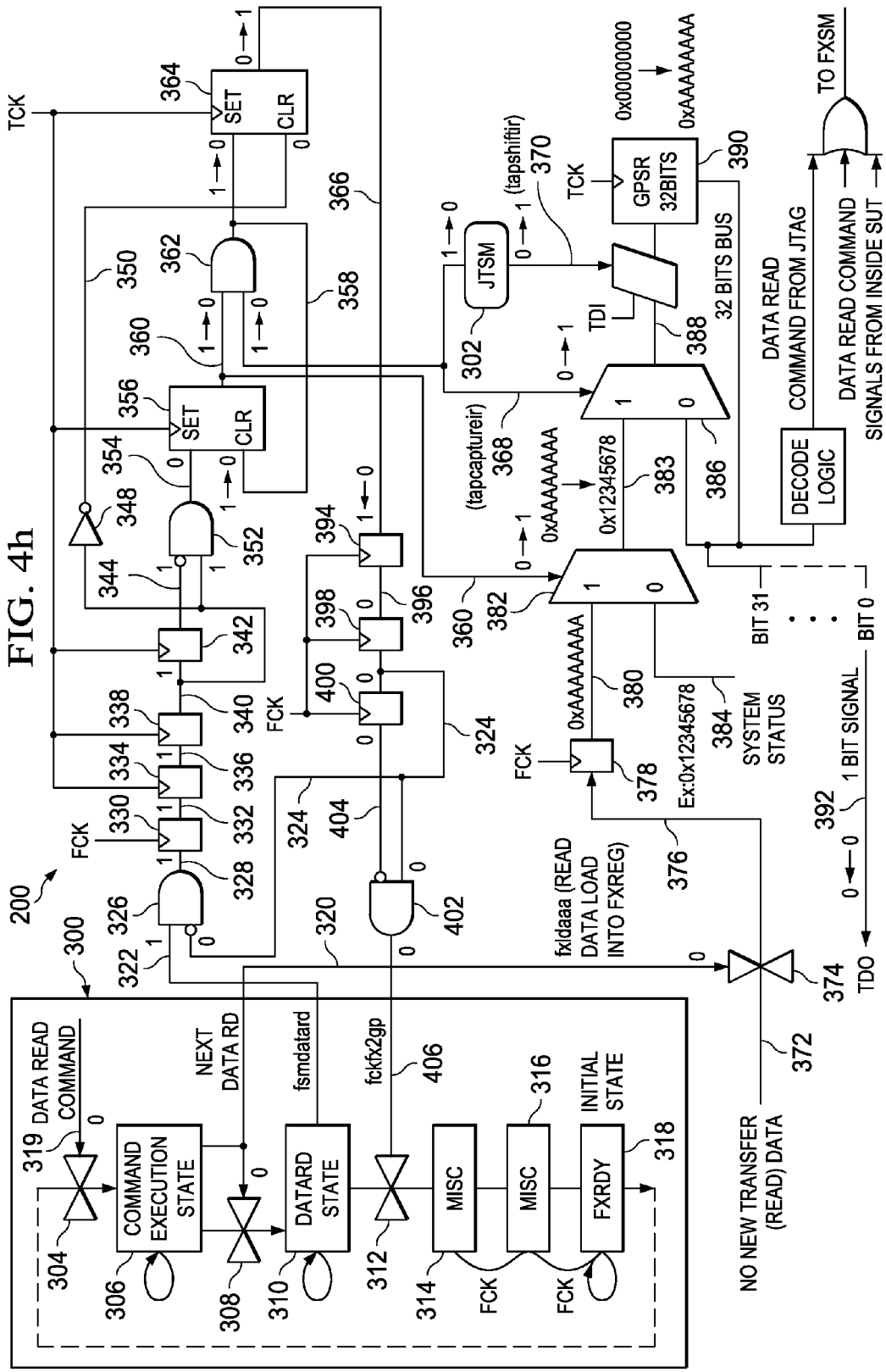

Referring to FIG. 4h, the output of FF 364 becomes "1". The output of FF 356 becomes "0", thereby causing the output of the AND gate 362 to become "0," the CLR input to FF 356 to become "0" and the SET input to FF 364 to become "0," and also causing the MUX 382 to permit the signal on node 384 to pass through. As a result, the signal on node 383 becomes "0x12345678." At about the same time/cycle, the signal 0xAAAAAAAA on node 388 is captured by the FF 390 for subsequent output to the testing logic 102. The LSB (Least Significant Bit) data of FF 390 appears on node 392. (The LSB data of 0xAAAAAAAA is "1".) Meanwhile, the JTSM 302 de-asserts the tapcaptureir signal on node 368 to "0" and asserts the tapshiftir signal on node 370. As a result, the gate 386 is closed and the data 0xAAAAAAAA of FF 390 is ready for shifting out.

As mentioned, FIGS. 4a-4h illustrate how the circuit logic 200 captures data in addition to the data capture shown in FIGS. 3a-3i, FIGS. 5a-5f, described below, illustrate how system status information (i.e., from node 384) is captured and output in lieu of the additional data capture of FIGS. 4a-4h.

Figure 5A:
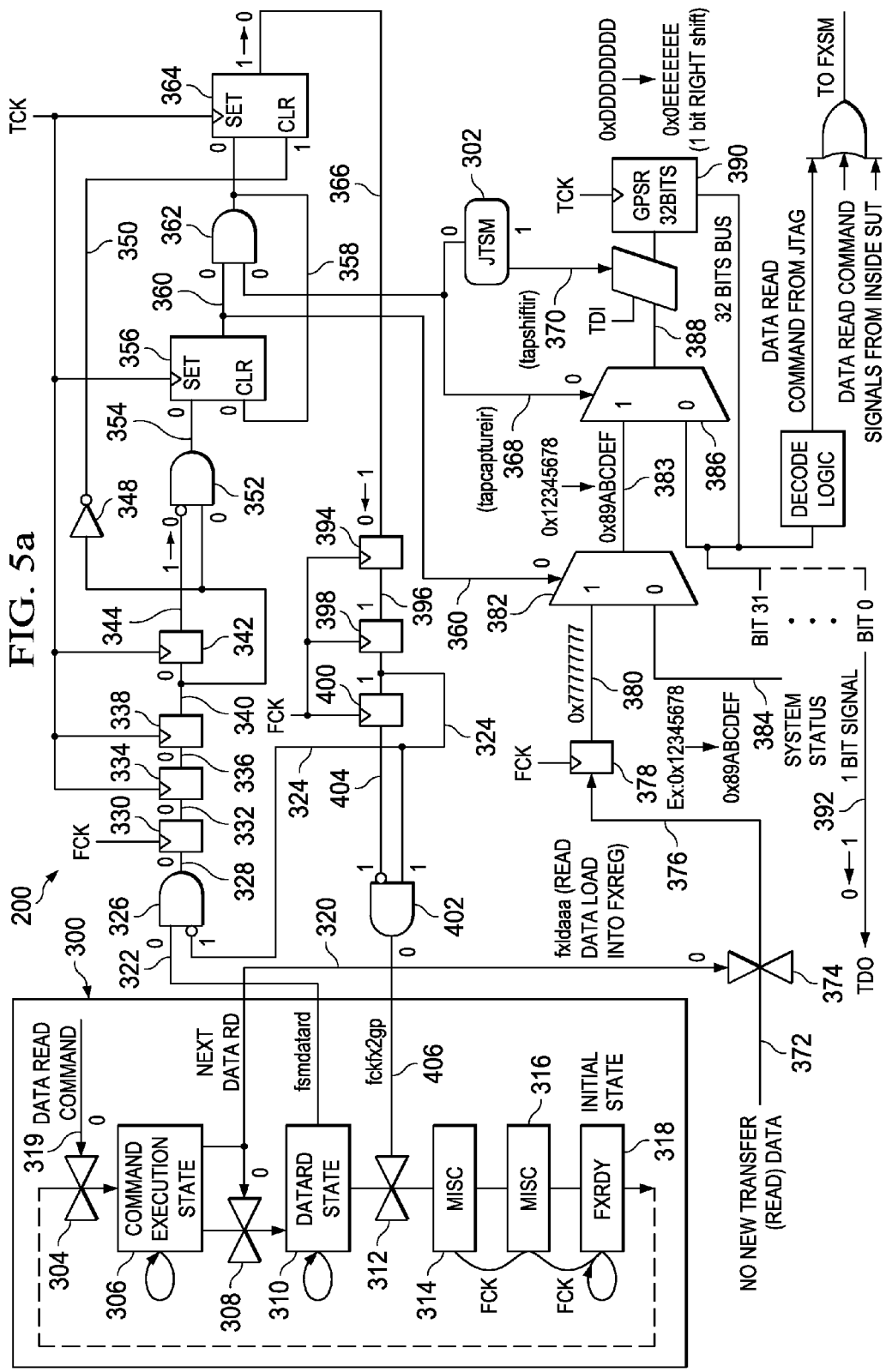
FIGS. 5a-5f show system status capture operations as performed by the illustrative circuit logic of FIGS. 3a-3i, in accordance with preferred embodiments.

Referring to FIG. 5a, while the FXSM 300 is still in the ready state 318, the FF 342 captures the "0" on node 340 and outputs the "0" onto node 344 by an increment of TCK. At about the same time/cycle, the FF 364 captures the "1" signal on the CLR input and, as a result, outputs a "0" onto node 366. The data of FF 390 is shifted out (e.g., 1 bit right shift by TCK) and, as a result, the data of FF 390 becomes "0x0EEEEEEE," thereby causing the output of FF 390 on node 406 to change to "0." Further, the system status may change. For example, the system status (on node 384) may change from the previous value of "0x12345678" to "0x89ABCDEF." Because the node 360 is "0," the MUX 382 permits the new system status value of "0x89ABCDEF" to pass through to the node 383.

Figure 5B:
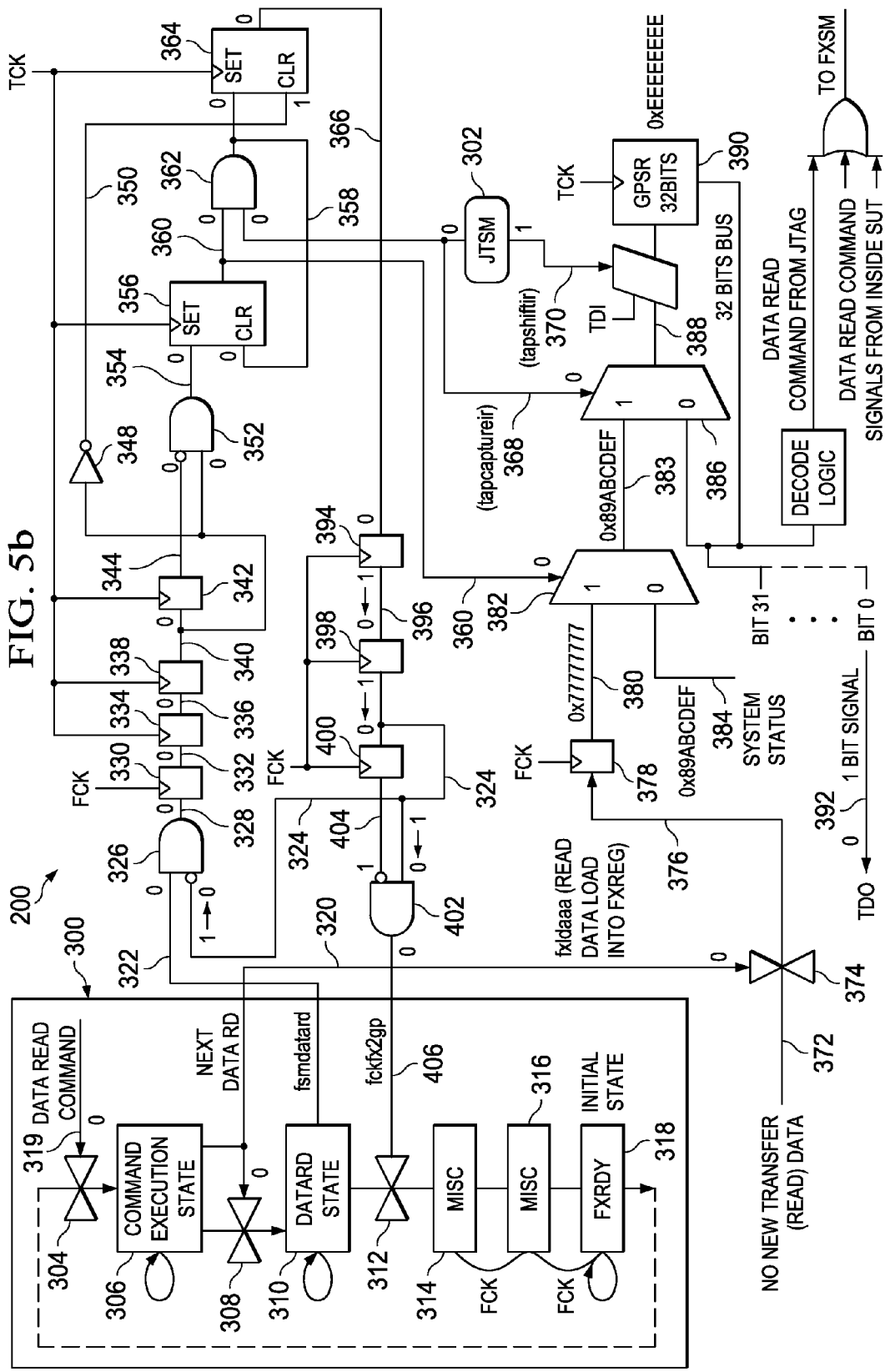
Figure 5C:
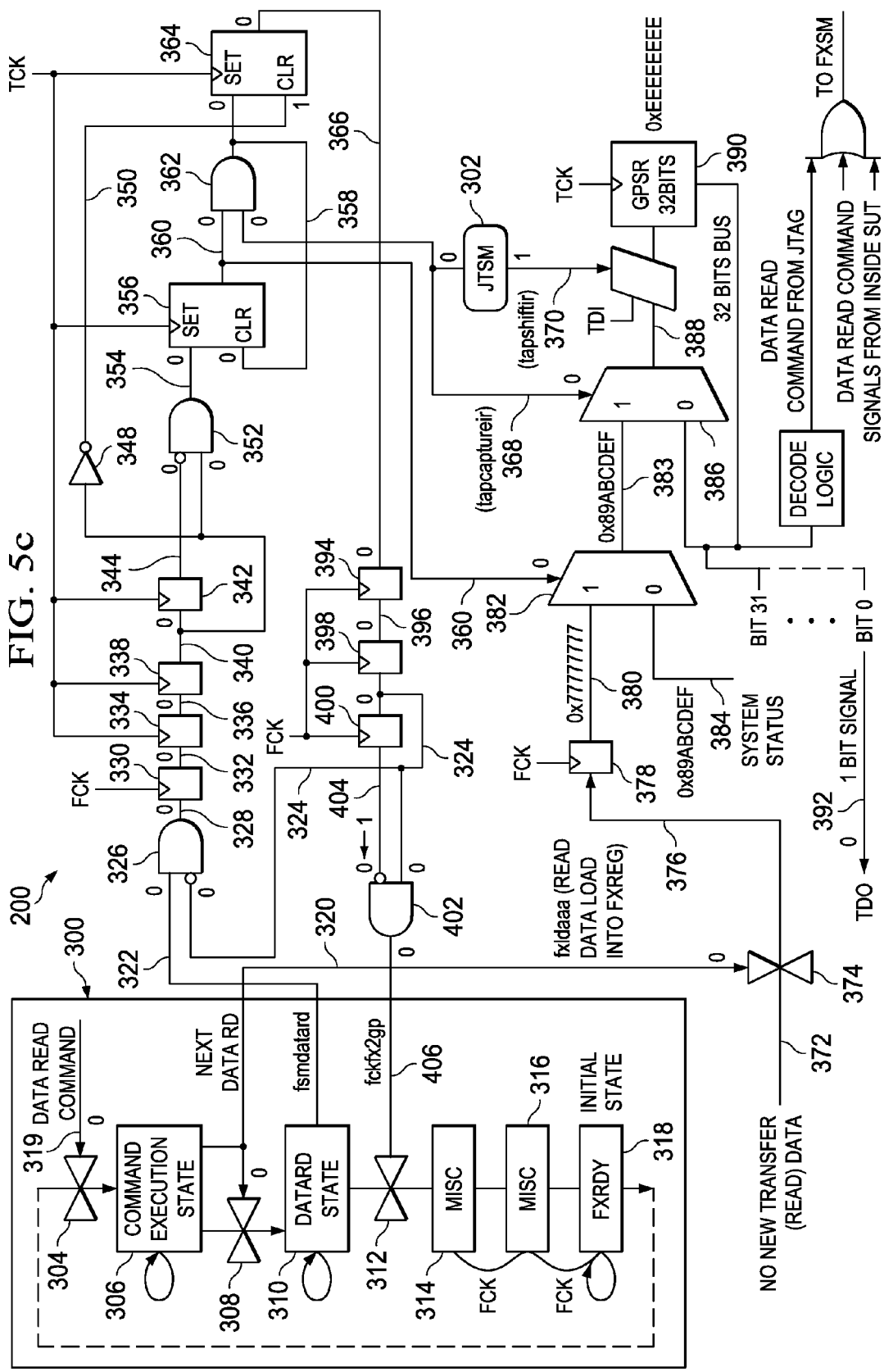
Figure 5D:
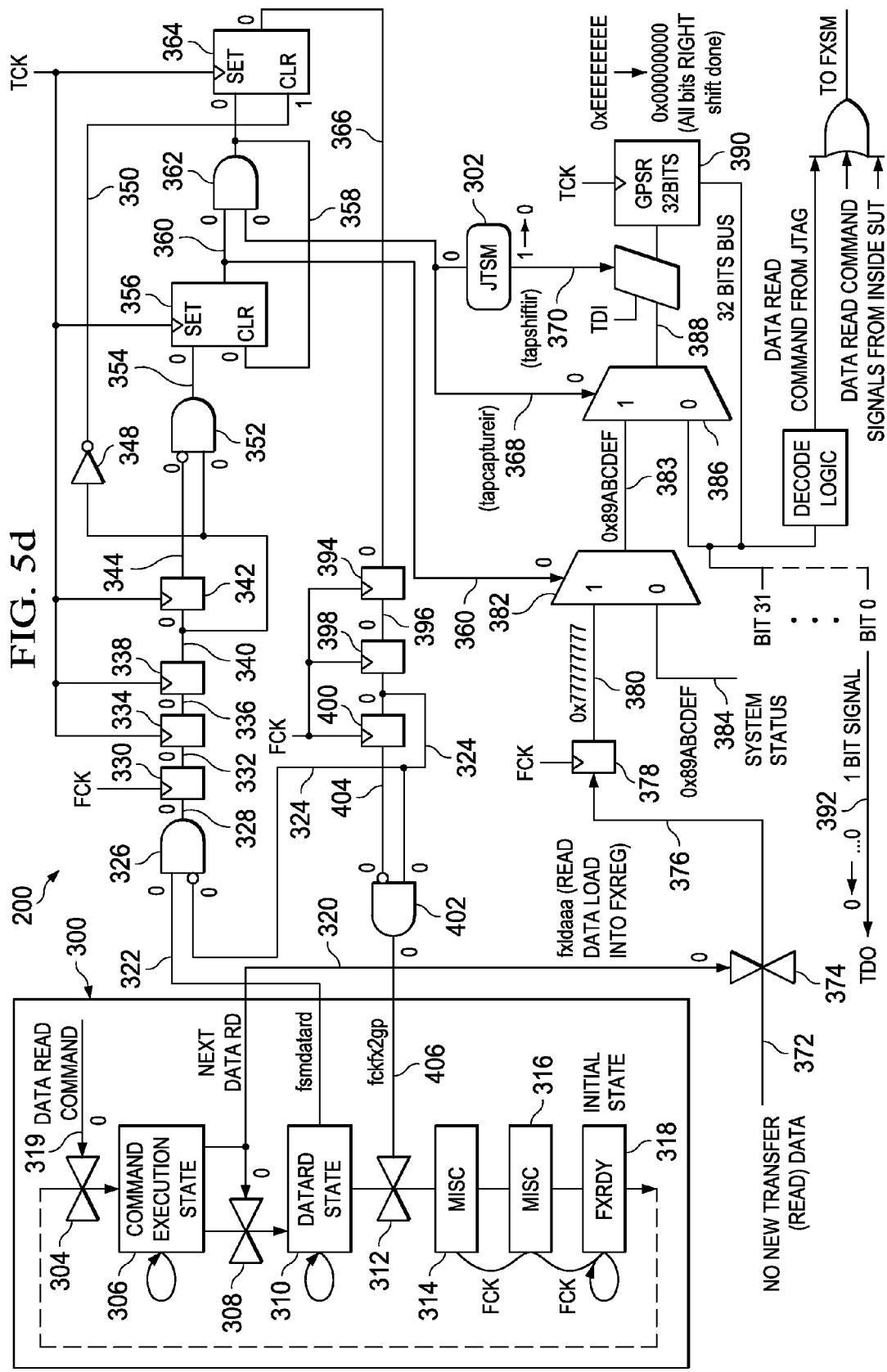
Figure 5E:
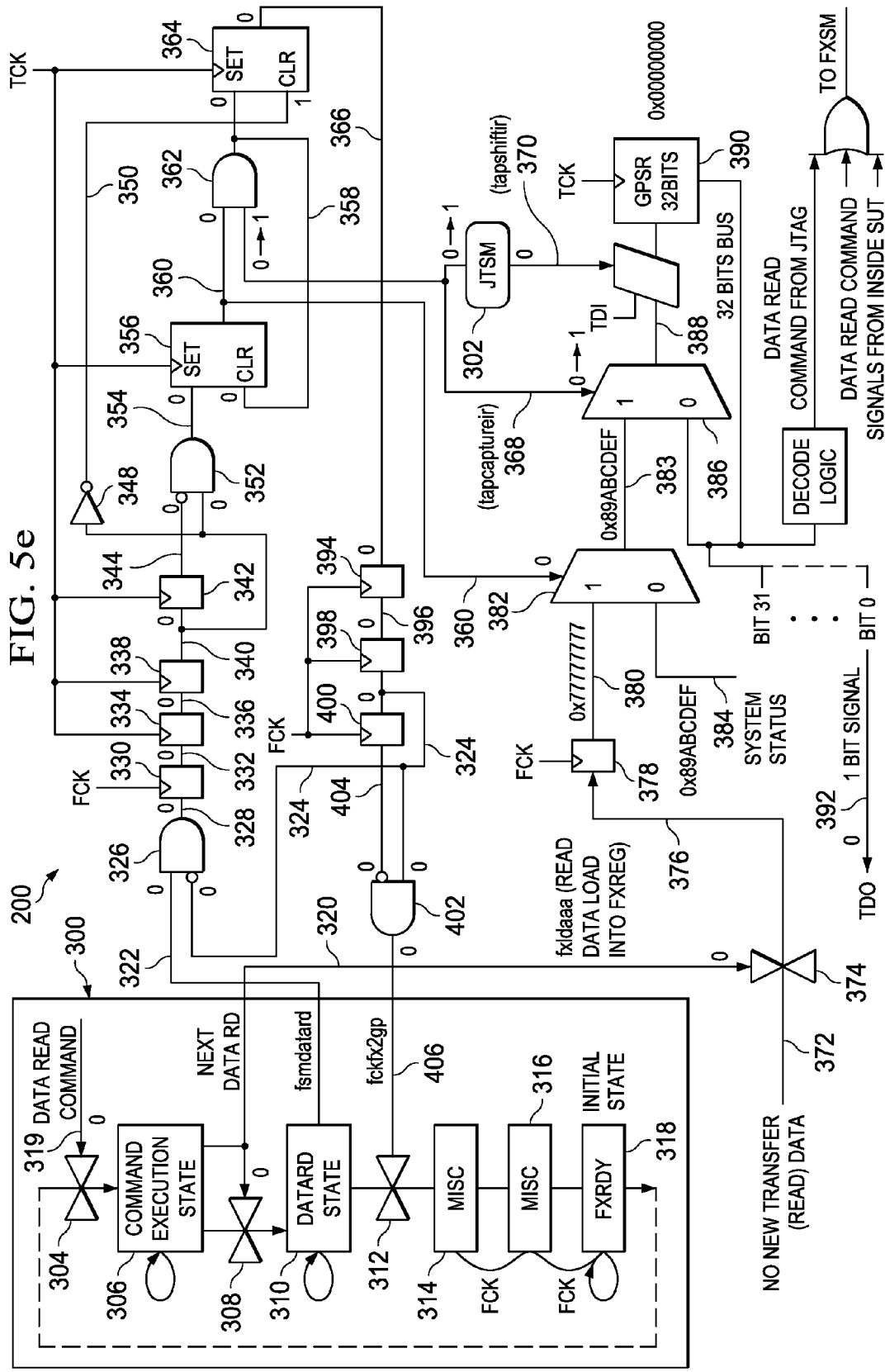

Referring to FIG. 5b, while the FXSM 300 is still in the ready state 318, the "0" on node 366 propagates through the FFs 394 and 398 to node 324. Referring to FIG. 5c, while the FXSM 300 is still in the ready state 318, the FF 400 captures the "0" on node 324 and outputs the "0" onto node 404. Referring to FIG. 5d, while the FXSM 300 is still in the ready state 318, the TCK and FCK continue to increment and to shift the captured data (e.g., read data) of the FF 390 out. The JTSM 302 changes the state of the tapshiftir signal on node 370 from "1" to "0" as soon as the captured data (e.g., read data) of FF 390 is transferred to the testing logic 102. As a result, the FF 390 is updated with new command data (e.g., 0x000000000). Referring now to FIG. 5e, while the FXSM 300 is still in the ready state 318, the FCK and TCK continue to increment and the JTSM 302 causes the tapcaptureir signal on node 368 to shift from "0" to "1," thereby causing the gate 386 to open and enabling the system status data "0x89ABCDEF" on node 383 to pass to node 388.

Figure 5F:
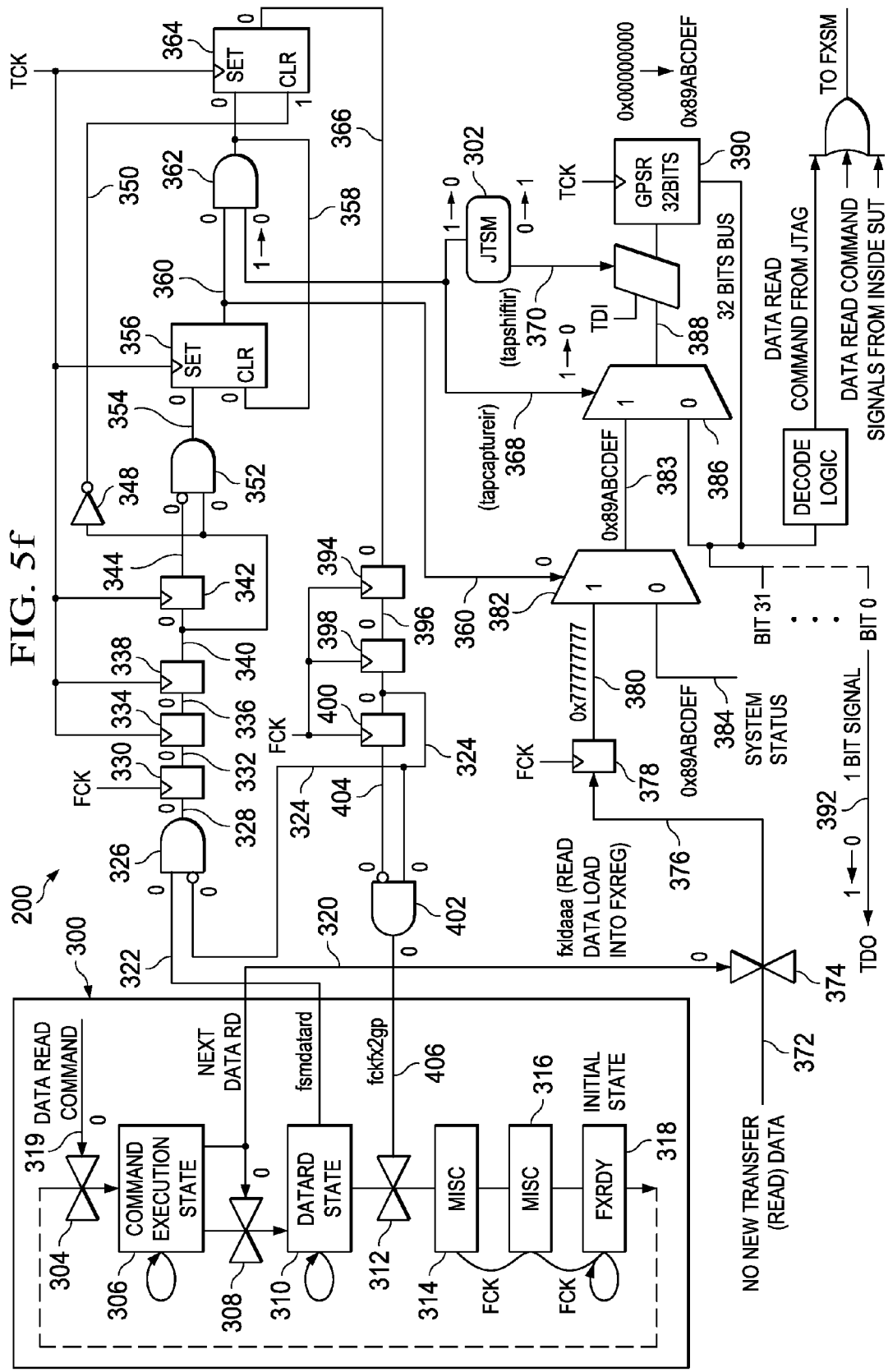

Referring to FIG. 5f, while the FXSM 300 is still in the ready state 318, upon an increment of the TCK, the FF 390 captures the system status data "0x89ABCDEF" on node 388 and stores the system status data for future output to the testing logic 102. The LSB data of FF 390 appears on node 392. Now, the LSB data of 0x89ABCDEF is "1." At about the same time/cycle, the JTSM 302 de-asserts the tapcaptureir signal on node 368 to "0" and asserts the tapshiftir signal on node 370. As a result, the gate 386 is closed and the system status data 0x89ABCDEF of FF 390 is ready for shifting out.

The discussion above has primarily been focused on an implementation in a testing system. However, the techniques described herein may be applied to any system having multiple clocks, including computers and computer peripheral devices, mobile communication devices, personal digital assistants, etc. All such variations and modifications are encompassed within the scope of this disclosure.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   storage comprising first and second data; and
   circuit logic coupled to the storage, said circuit logic receives a plurality of clock signals;
   wherein, as a result of receiving a signal, the circuit logic uses the plurality of clock signals to obtain the first and second data and to provide the first and second data to target logic coupled to the circuit logic;
   wherein the system resets said circuit logic between providing said first data and providing said second data;
   wherein said circuit logic comprises a first flip-flop (FF), a second FF, a third FF and a fourth FF, and wherein the first and second FFs couple without an intervening FF, and wherein the third and fourth FFs couple without an intervening FF, and wherein the first and second FFs operate using a clock signal of different frequency than that used by the third and fourth FFs.

2. The system of claim 1, wherein the system resets said circuit logic prior to providing each of a plurality of data to the target logic.

3. The system of claim 1, wherein the system resets said circuit logic by initializing a plurality of flip-flops used to provide said first and second data to the target logic.

4. The system of claim 1, wherein the circuit logic uses Joint Test Action Group (JTAG) technology to communicate with the target logic.

5. A system, comprising:
   storage comprising first and second data; and
   circuit logic coupled to the storage, said circuit logic receives a plurality of clock signals;
   wherein, as a result of receiving a signal, the circuit logic uses the plurality of clock signals to obtain the first and second data and to provide the first and second data to target logic coupled to the circuit logic;
   wherein the system resets said circuit logic between providing said first data and providing said second data;
   wherein the circuit logic comprises an AND gate coupled to a first flip-flop (FF) receiving a first clock signal, the first FF coupled to second, third and fourth FFs receiving a second clock signal, the fourth FF coupled to another AND gate, said another AND gate coupled to a fifth FF, said fifth FF coupled to a different AND gate, said different AND gate and said third FF coupled to a sixth FF, the fifth and sixth FFs receiving said second clock signal, the sixth FF coupled to seventh, eighth and ninth FFs receiving said second clock signal, the eighth FF and the ninth FF coupled to a separate AND gate, said eighth FF coupled to said AND gate, said fifth FF and an input to the different AND gate used to capture said first and second data.

6. The system of claim 1, wherein said circuit logic further comprises a feedback arrangement configured to control transfer of data between different clock domains.

7. A method, comprising:
   receiving a first signal from target logic;
   in response to said first signal, using storage logic and a plurality of clock signals to obtain a first data, control transfer of the first data between different clock domains, and to provide said first data to the target logic;
   receiving a second signal from the target logic;
   in response to said second signal, using the storage logic and the plurality of clock signals to obtain a second data, control transfer of the second data between the different clock domains, and to provide said second data to the target logic; and
   resetting said storage logic in between providing said first data and obtaining said second data;
   wherein using the storage logic comprises using a storage logic that includes first, second, third and fourth flip-flops (FFs), and wherein the first and second FFs couple without an intervening FF, and wherein the third and fourth FFs couple without an intervening FF, and wherein the first and second FFs operate using a clock signal of different frequency than that used by the third and fourth FFs.

8. The method of claim 7 further comprising transferring said first and second data to the target logic using Joint Test Action Group (JTAG) technology.

9. A method, comprising:
receiving a first signal from target logic;
in response to said first signal, using storage logic and a plurality of clock signals to obtain a first data, control transfer of the first data between different clock domains, and to provide said first data to the target logic;
receiving a second signal from the target logic;
in response to said second signal, using the storage logic and the plurality of clock signals to obtain a second data, control transfer of the second data between the different clock domains, and to provide said second data to the target logic; and
resetting said storage logic in between providing said first data and obtaining said second data;
wherein using the storage logic comprises using a storage logic that includes an AND gate coupled to a first flip-flop (FF) receiving a first clock signal, the first FF coupled to second, third and fourth FFs receiving a second clock signal, the fourth FF coupled to another AND gate, said another AND gate coupled to a fifth FF, said fifth FF coupled to a different AND gate, said different AND gate and said third FF coupled to a sixth FF, the fifth and sixth FFs receiving said second clock signal, the sixth FF coupled to seventh, eighth and ninth FFs receiving said second clock signal, the eighth FF and the ninth FF coupled to a separate AND gate, said eighth FF coupled to said AND gate, said fifth FF and an input to the different AND gate used to capture said first and second data.

10. A system, comprising:
means for storing used to obtain and output multiple data to other logic external to the means for storing, each datum obtained and output as a result of receiving a different request signal from the other logic, the means for storing obtains and outputs said multiple data using multiple clock signals; and
means for resetting said means for storing, the means for resetting maintains data coherency in the means for storing by resetting the means for storing prior to obtainment and output of each datum;
wherein said means for storing includes first, second, third and fourth flip-flops (FFs), and wherein the first and second FFs couple without an intervening FF, and wherein the third and fourth FFs couple without an intervening FF, and wherein the first and second FFs operate using a clock signal of different frequency than that used by the third and fourth FFs.

11. A method, comprising:
receiving a first signal from target logic;
in response to said first signal, using storage logic and a plurality of clock signals to obtain a first data, control transfer of the first data between different clock domains, and to provide said first data to the target logic;
receiving a second signal from the target logic;
in response to said second signal, using the storage logic and the plurality of clock signals to obtain a second data, control transfer of the second data between the different clock domains, and to provide said second data to the target logic; and
resetting said storage logic in between providing said first data and obtaining said second data;
wherein the means for storing includes an AND gate coupled to a first flip-flop (FF) receiving a first clock signal, the first FF coupled to second, third and fourth FFs receiving a second clock signal, the fourth FF coupled to another AND gate, said another AND gate coupled to a fifth FF, said fifth FF coupled to a different AND gate, said different AND gate and said third FF coupled to a sixth FF, the fifth and sixth FFs receiving said second clock signal, the sixth FF coupled to seventh, eighth and ninth FFs receiving said second clock signal, the eighth FF and the ninth FF coupled to a separate AND gate, said eighth FF coupled to said AND gate, said fifth FF and an input to the different AND gate used to capture said first and second data.

* * * * *